(12) United States Patent  
Twyman

(10) Patent No.: US 8,352,311 B2  
(45) Date of Patent: Jan. 8, 2013

(54) INTERNET BASED ACHIEVEMENT AND SKILLS MANAGEMENT PROCESS AND METHOD

(76) Inventor: Christopher Twyman, Brookline, MA (US)

( * ) Notice: Subject to any disclaimer, the term of this patent is extended or adjusted under 35 U.S.C. 154(b) by 918 days.

(21) Appl. No.: 12/291,980

(22) Filed: Nov. 17, 2008

(65) Prior Publication Data

US 2010/0125475 A1    May 20, 2010

(51) Int. Cl.
*G06Q 10/00* (2012.01)
(52) U.S. Cl. .............. 705/7.42; 705/7.31; 705/7.32; 705/34; 705/304; 705/320
(58) Field of Classification Search ................ None
See application file for complete search history.

(56) References Cited

U.S. PATENT DOCUMENTS

| | | | | |
|---|---|---|---|---|
| 7,028,006 | B1 * | 4/2006 | Marsden et al. | 705/36 R |
| 7,203,655 | B2 * | 4/2007 | Herbert et al. | 705/7.42 |
| 7,212,985 | B2 * | 5/2007 | Sciuk | 705/7.33 |
| 7,720,706 | B2 * | 5/2010 | Herbert et al. | 705/7.42 |
| 7,874,957 | B2 * | 1/2011 | Hurwitz et al. | 482/8 |
| 7,904,328 | B2 * | 3/2011 | Sciuk | 705/7.31 |
| 2001/0056367 | A1 * | 12/2001 | Herbert et al. | 705/11 |
| 2005/0287505 | A1 * | 12/2005 | George | 434/236 |
| 2006/0026069 | A1 * | 2/2006 | Mazurkiewicz et al. | 705/14 |
| 2006/0178919 | A1 * | 8/2006 | Warncke | 705/8 |
| 2006/0229896 | A1 * | 10/2006 | Rosen et al. | 705/1 |
| 2006/0229933 | A1 * | 10/2006 | Stith | 705/10 |
| 2007/0230682 | A1 * | 10/2007 | Meghan et al. | 379/265.06 |
| 2007/0300148 | A1 * | 12/2007 | Aniszczyk et al. | 715/513 |
| 2008/0015089 | A1 * | 1/2008 | Hurwitz et al. | 482/8 |
| 2010/0153289 | A1 * | 6/2010 | Schneiderman et al. | 705/320 |
| 2011/0131120 | A1 * | 6/2011 | Sciuk | 705/34 |

OTHER PUBLICATIONS

Moore, S.. Assessing the professional development needs of principals and leaders in preK—12 educational settings. Ph.D. dissertation, Syracuse University, United States—New York.*

O'Rear, Holly Michelle (2002). Performance-based training evaluation in a high-tech company. Ph.D. dissertation, The University of Texas at Austin, United States—Texas.*

* cited by examiner

*Primary Examiner* — Gurkanwaljit Singh
(74) *Attorney, Agent, or Firm* — Lambert & Associates; Gary E. Lambert; David J. Connaughton, Jr.

(57) ABSTRACT

An Internet Based Achievement Management Process & Method of use thereof which generally comprises computer software, including internet web page based code, and methods of applications that allows a user to mange, track, and record events and or achievements which pertain to professional, educational, and or personal goals as well as the ability to measure or compare the events and or achievements against their peers by means of an impartial third party review and assessment process.

8 Claims, 33 Drawing Sheets

Click to keep this panel open!

Click to keep this panel open!

FIG. 14

⑧ | ACHIEVEMENTS SCALE
This axis shows the number of zapoints you are achieving based on the inputs you have entered in your history, objectives and yearly assessments. [X]

Click to keep this panel open!

FIG. 15

LIFECHART™ PROFESSIONAL / EDUCATIONAL / PERSONAL LINES
Your Zapoint Lifechart™ contains 3 lines. One displays your professional achievements (blue), one your educational ones (golden) and the other one your personal activities as inputted on zapoint (green). Each line will rise and fall depending on what you were doing that year compared to the previous years.

Click to keep this panel open!

No. OF ZAPOINTS
When you move your mouse pointer over the professional, educational and/or personal lines on the Lifechart™, these boxes show up and highlight the points you achieved in that particular year across your professional, educational and personal areas.

Click to keep this panel open!

(10)

Figure 17
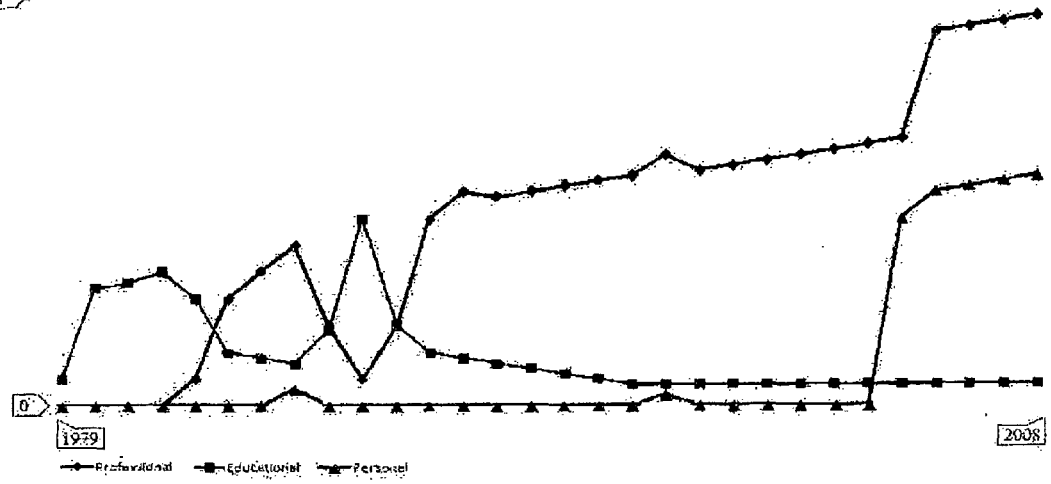
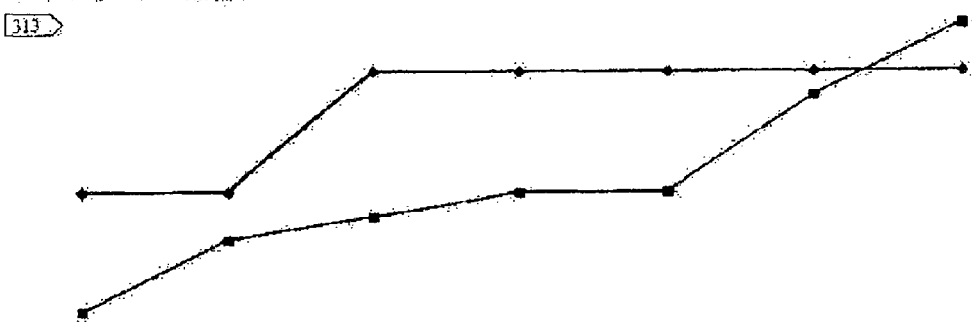

INTERNET BASED ACHIEVEMENT AND SKILLS MANAGEMENT PROCESS AND METHOD

FIELD OF THE INVENTION

This invention relates generally to the field of applications for automated achievement and talent management systems. Moreover it pertains specifically to such service applications which allow a user (the user can be an individual professional, a member of an alumni association, an enterprise member or talent manager, a recruiter), to manage, track, and record events and or skills and achievements which pertain to professional, educational, and or personal goals.

BACKGROUND OF INVENTION

Description of the Related Art

The competitive nature of the online employment services market is a clear indicator that the market is ready for a new approach. The transition of employment services from agencies and recruiters to the Internet is a natural result of a "self-serve" market economy, and this is evident from the rapid growth of the major online job sites. Also, many signs point toward growth in the economy which stimulates a company's hiring activity along with employees seeking better employment. Coupled together, it is a reasonable conclusion that online job sites will play an expanding role in the job seeker's and employer's needs for connecting.

However, currently the ratio of resumes to online job postings is greater than 50:1, with numerous sites proclaiming of the millions of resumes stored on their sites. Furthermore, resumes are difficult to decode and many hiring agents usually funnel data into a standardized application, leaving many applicants unable to distinguish themselves from others. In addition, the rise of software filtering programs removes any personal style left in an applicant's resume.

On the flip side, from the job seeker's perspective, applying for jobs online can be a daunting task, with the expectation that nothing will come of it. The impersonal nature of automatic email responses along with non-existent communication from job postings can provide a false sense of hope; even though it is likely the hiring agent never saw the job seeker's resume.

Furthermore, the online job search market is enormous, with millions of people each year posting resumes and job opportunities online at such popular sites as Monster.com, Careerbuilder.com, Linkedin.com and Craigslist.org. However, most of these solutions consist of simple searching tools, wherein they are simply searching an individuals resume for keywords that match an employer's search, or alternatively, searching an employers job opportunity that match a job seeker's search. Therefore, even though an individual may locate a perspective employee or employment opportunity, there is much human interaction that is still needed to filter the results of the above-referenced search to determine whether an adequate fit exists.

The amount of time necessary for an individual to spend on this second layer of filtering can be daunting. Further complicating this process is the fact that it is very difficult sometimes to find the right candidate for a job opening. Some candidates that an employer locates may already have a job, or are no longer interested in the posted employment opportunity, even though a candidate's resume stays on the job site. These are very common concerns of any employer looking for potential employees and can be described as "SEARCHING PROBLEMS".

In addition to the frustration employers may encounter in finding the right candidate, job seekers often find these job sites just as tedious and difficult to navigate. Often time's job seekers find it is difficult to describe them simply with a resume. In addition, searching for a job opportunity based on only using keywords tends to be a fruitless endeavor since it is difficult to locate an ideal job opportunity based on a single keyword search. Currently, there is no system that will present job matches that are likely correct for a job seeker based on past searches and an individual's interest and this can be described as "SEEKING PROBLEMS".

Finally, the current solutions are extremely expensive for employers when they wish to find candidates. On average, most sites charge over $1000.00 a month for search access, and approximately $400.00 to simply post a job opening. As a result, most employers will find this too expensive after a cost-benefit analysis reveals there are not enough quality candidates identified from an employers search as a result of the "SEARCHING PROBLEMS" described above. Therefore, employers could be spending thousands of dollars in search fees for candidates that don't interest them at all and this can be described as "PRICING PROBLEMS".

SUMMARY OF THE INVENTION

The instant invention, as illustrated herein, is clearly not anticipated, rendered obvious, or even present in any of the prior art mechanisms, either alone or in any combination thereof. In view of the limitations now present in the prior art, the present invention provides a new and useful Internet Based Achievement and Talent Management Process & Method of use thereof, which is simpler in use, more universally functional and more versatile in operation than known applications of this kind. The invention is a strategic single algorithmic talent system to apply numerical value to skills and achievements for professionals, alumni groups, enterprises and recruiters, facilitating innovative talent management, networking and communications.

The purpose of the present invention is to provide a new internet based service that allows a user to manage, track, and record events and or achievements and skills which pertain to professional, educational, and or personal goals, as well the ability to measure or compare the events and or achievements against their peers by means of an impartial third party review and assessment process.

It is also a purpose of the present invention to provide a new Internet Based Achievement and Talent Management Process & Method of use thereof which has many novel features not offered by the prior art applications that result in a new Internet Based Achievement and Talent Management Process & Method of use thereof which is not apparent, obvious, or suggested, either directly or indirectly by any of the prior art applications. The application uses an algorithmic data model that enables the objective comparison of skills and achievements across the entire talent management value chain, from recruiting employees, to maintaining and developing talent effectively.

The present invention generally comprises computer software, including internet web page based code, and methods of applications for providing the user with an internet based website service that allows a user to go to the main service website, sign up or join as a registered member, enter information pertaining to events, skills and or achievements related to their professional, educational, and or personal life, such as setting goals, or entering information related to an event that has already occurred, such as level of education attained, thereby submitting the event or achievement and skills tags information to the main service website where it is reviewed and processed through an algorithm which assigns a numeric value to the event or achievement.

This numeric value reflects the career level of the event (junior, mid-level, senior) and, in the case of professional events, the type of employment (full-time, part-time, project). This numeric value is then recorded and saved within the user's profile on the main service website database and contributes towards an overall number of Zapoints, which indicate the users achievement level.

The user can then also seek assessment from a third party to validate their claims pertaining to their skills and achievements within the event (historical entry) and the algorithm then applies a higher numerical value to the event. An increase in the numerical value for an event is also applied when there is an increase in the duration of the event or where the event is a professional entry which reflects a promotion.

The numerical values applied to a user's achievements are intended to allow a user to track and manage the event or achievement information to assess specific and or overall progress as it relates to the achievement of set goals, or accomplishments within one or a multitude of life areas. It is further intended that the user can access, transfer, manage, and or present their data in a variety of formats including resume and graphical formats.

It is also intended that the present invention be used as a tool, method or process which will help to create a standard format for accurate, reliable resume information by allowing the user to employ real life experience and or achievements from a multitude of life areas.

The unique impartial third party review process will allow for an accurate assessment of event or achievement and the assignment of numeric value based on peer comparison data. The quantifying of a user's achievements using the above criteria enables the member or other user of the site to objectively compare a user's achievements with those of another user.

The talent profile and numerical value assigned by the algorithmic model creates a unique talent profile which creates a comparable and mobile talent currency, which can be applied and developed across a broad talent management spectrum. Thus, the several embodiments of the instant invention are illustrated herein.

Therefore, a principal object of the present invention is to provide an Internet Based Achievement and Management Process & Method of use thereof that will overcome the deficiencies of the prior art devices.

It is an object of the present invention is to expedite the search and analysis process, by quickly and automatically converting achievement and skill information into a numerical format that can be objectively compared.

It is another object of the present invention is to provide an Internet Based Achievement Management Process & Method of use thereof that offers a new and novel way for a web surfer to interact with web based content.

It is another object of the present invention is to provide an Internet Based Achievement Management Process & Method of use thereof that allows users to manage their achievements in any field of life, and assign an objective numerical value to their achievements thereof.

It is another object of the present invention is to provide an Internet Based Achievement Management Process & Method of use thereof that allows users to manage the goal setting, measurement and attainment of objectives within a free, secure web based environment.

It is another object of the present invention is to provide an Internet Based Achievement Management Process & Method of use thereof that allows a user to measure their performance against their peers in a secure and anonymous manner.

It is another object of the present invention is to provide an Internet Based Achievement Management Process & Method of use thereof that will act as a true resume of a users life due to the fact that all achievement is graded by a third party.

It is another object of the present invention is to provide an Internet Based Achievement Management Process & Method of use thereof that will allow a user to record and track the professional, educational, and personal events and or achievements of their life and provides them with the ability to access, transfer, and or download the information at any time from a remote location.

It is an object of the instant invention to provide a system wherein the targeted information can be viewed in a variety of formats, including a text resume and a Lifechart™ which displays the achievement scores graphically for the entire period for which the user has entered historical information. The Lifechart™ view is an interactive visual tool, which enables the user to identify in which historical entries the member has identified particular skills.

It is another object of the instant invention is to provide an Internet Based Achievement Management Process & Method of use thereof that utilizes an impartial third party review process to evaluate members achievements, and then to assign a numeric value thereof.

It is another object of the present invention is to provide an Internet Based Achievement Management Process & Method of use thereof that attempts to standardize the resume writing process and convert the achievement and skills information into a transferrable and common "talent" currency, which can be used as the basis for Zapoint's extended enterprise, groups and talent management services, as well as for the management of achievement outside the Zapoint site.

It is another object of the present invention is to provide an Internet Based Achievement Management Process & Method of use thereof that is more universally functional in today's market than the prior art devices.

These together with other objects of the invention, along with various features of novelty which characterize the invention, are pointed out with particularity in the claims, Detailed Description of the Embodiments Sections and drawings of this application, with all said sections adding to this disclosure.

There has thus been outlined, rather broadly, the more important features of the system and method for bringing together employers and job candidates, in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

FIG. 14 a Lifechart with Indicator 8, the Achievement scale, illustrates the number of zapoints a user is achieving based on the inputs of history, objectives and yearly assessments;

FIG. 15, a Lifechart™ with Icon 9, discussing the Educational, Professional and Personal lines and how each individual line serves to illustrate the career direction of the user;

FIG. 16 Lifechart™ with Icon 10, Number of zapoints, illustrates to the user how to utilize the pointer within the Lifechart™ to find out how many zapoints have been accumulated on each of Educational, Professional and Personal lines to observe the actual number of zapoints accumulated;

FIG. 17 illustrates an Enterprise Lifechart;

FIG. 22 illustrates the launch page of the Recruiter menu;

FIG. 25 illustrates the launch page of the Diversity Dashboard menu.

DETAILED DESCRIPTION OF THE DISCLOSED EMBODIMENTS

Figure 1:
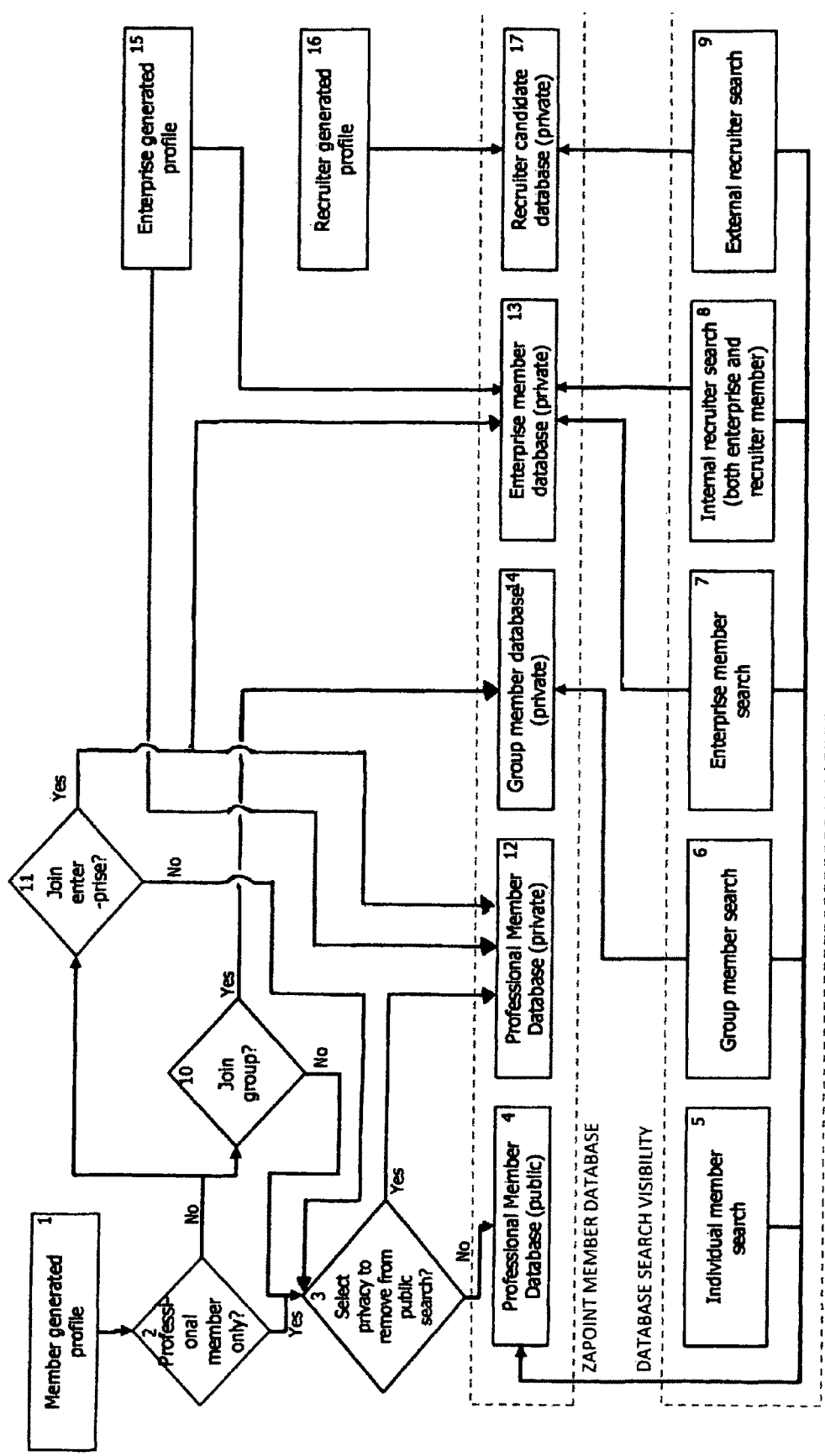
FIG. 1 illustrates the Database and Work Visibility system and menus.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The figures discussed below shows the workflow in the creation of a Zapoint profile, with numeric values given to the events or achievements included in the user's Zapoint profile. The numeric values assigned are dynamic, with increases in the numeric value calculated by the algorithm as the result of third party validation of a claim or assessment, increased duration in the particular role or promotion to a more senior role.

Below is a summarization of the algorithm and the systems involved, therein. Reviewing the ACHIEVEMENT portion of the algorithm, for each entry a user includes in their profile, the algorithm calculates a score. We worked with career development around a hundred HR professionals to agree representative values to attribute to achievements and. The factors influencing the base score for each entry are: Professional Entry, which includes Duration, Job level (Junior/mid-level/senior) and Job type (full-time/part-time/project). A further factor is Educational Entry, which includes Duration and Education level (bachelors, masters, doctorate). Still a further factor is the Personal Entry which includes Duration. An additional factor is Objectives which includes Complexity, Duration and Level of achievement.

There are then, several factors that increase a score. These are: Promotion—this provide a percentage uplift; Assessment—3rd party validation of an entry (i.e. assessment/reference) provides a percentage uplift; Duration—if someone remains in the same position, the score increases over time, but the percentage annual increase drops each year, so the line on the graph becomes less steep. The above factors all affect the achievement score, which is the number of zapoints shown on the y-axis of the Lifechart.

Reviewing the SKILLS portion of the algorithm, in addition to the achievement scores, search and ranking takes into account skills tags. Skills tags are noted for each entry on the Zapoint history/profile and can either be manually chosen by the member or can be automatically extracted from their electronic resume when this is uploaded on the site.

When a generic search term is entered into either the simple search or advanced search mechanism, this searches the names, employers, job titles, and skills in all members' profiles. The search results are then ranked in order of the match with the search criteria, based on both achievement and skills. The skills element of the search is ranked by the algorithm based on frequency and duration of the skill match (i.e. if the search term is "marketing" someone with a skills tag of "marketing" in a role for 5 years will score higher than someone with "marketing" as a tag in a 3 year role.

Lifechart 2.0 (e.g. http://salt.zapoint.com/lifechart/twozero/person'sname?nolayout=true) shows the Lifechart™ with the skills listed on the right hand side in order of frequency. Pointing the cursor at a skill highlights the role in which the skill is identified. Pointing at the skill icon for a role highlights the respective skills in the list to the right.

The information entered or uploaded by the user is assigned numerical values using Zapoint's algorithmic date model, and unique representations of the data are generated in the form of a graphical representation (Lifechart™) of the user's professional, educational and personal achievements and skills; and a Zapoint Resume including text versions of the resume entries, with skills tags that are automatically extracted from the resume in the case of an electronic upload, but editable by the member.

The base user/member account service may be offered completely free and supported by advertiser clicks, and an optional premium service may be offered as a paid subscription service. In one embodiment, illustrated is an alumni association networking and communication tool with database capabilities for storing and displaying member information to other members of the alumni association. The Zapoint Alumni service applies the unique algorithmic data application to an alumni group or association to offer a communications and networking tool which differs from current tools available to such groups. The member profile, created from uploading an existing resume or entering resume information into the system then becomes a dynamic profile within the alumni networking tool, enabling alumni to apply Zapoint's search algorithm technology to the group members, to identify past and present skill, achievement and location information. This enables the creation of a closed network around the alumni association, and also enables alumni association members to add value by having access to Zapoint's unique talent management and recruiting capabilities.

Further illustrated is an enterprise talent management tool which creates an individual user profile for each of the participating employees, and then allows the enterprise to map skills and achievements, displaying this information in a variety of formats. The enterprise service builds on the algorithms individual member profiles to create a unique view of the skills and achievements within the enterprise. The algorithm is applied to all members of the enterprise, to create Lifecharts™ and Skills profiles for departments and the enterprise as a whole, in order for members to be able to compare skills and achievements not only against their peers but against their department and enterprise averages, to provide further performance and talent management analytics.

FIG. 3 illustrates a recruitment tool and the Recruitment workflow for use by both internal enterprise recruiters and recruitment companies to search the user profiles in the database to identify potential candidates for job vacancies. The recruiter service enables a recruiter to search existing user profiles and upload new profiles electronically, converting multiple forms of resumes into the standard Zapoint resume format, with numeric scores and Lifecharts for all users. Recruiters are then able to search and use the algorithm to rank the user profiles against their specific skill and achievement criterion companies to search the user profiles in the database to identify potential candidates for job vacancies.

Figure 4:
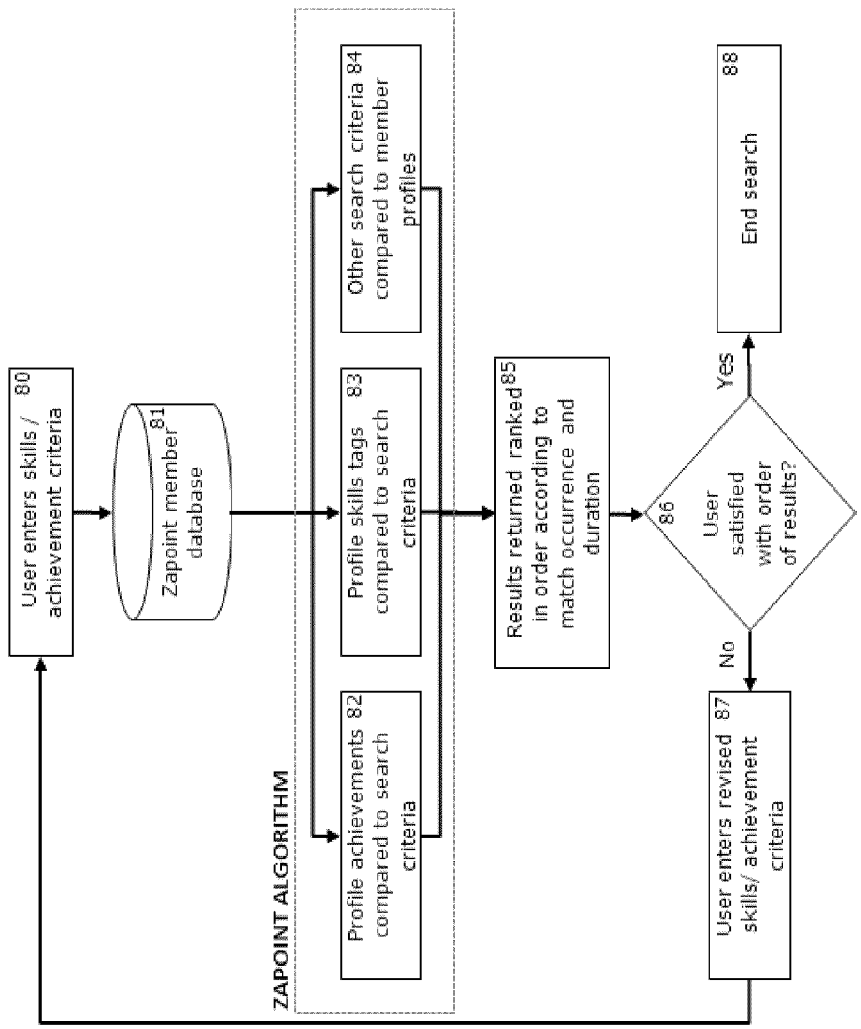
FIG. 4 illustrates the Search Workflow system and menus.

FIG. 4 illustrates a resume processing tool which enables recruiters to automatically upload candidate resumes, to create a profile for each candidate, which are then stored in a closed environment which the recruiter can search in order to list candidates in order, according to how they match the search criteria. The resume processing service builds on the recruiter service as detailed above, by enabling recruiters to upload multiple resumes into closed search environments, enabling them to quickly apply the Zapoint algorithm to existing candidate profiles, in order to expedite the analysis and selection process.

Recruiters can apply specific search criteria, which the algorithm then applies to the profiles available in order to present the results to the recruiter in the order which best matches their search criteria. This uses the achievement points and scores, and the individual skills tags specified on the recruiter's search definition.

A number of ways exist to generate revenue from this business model. They include but are not limited to 1) resell of advertising directly within the main service website; 2) charge users/members a fee for each evaluation completed; 3) paid premium service offerings that provide the user/member with premium services; and 4) user/member periodic or one time subscription revenues.

As illustrated in FIG. 1, the Database and Search Visibility System operates as follows: the process begins with a member generated profile 1. The user is prompted first as to whether the user is a Professional member only 2. If yes, the user may Select privacy to remove from public 3. If no, Professional Member Database (public) 4, within the Zapoint Member Database 21, wherein the user may choose from Individual member search 5, Group member search 6, Enterprise member search 7, Internal recruiter search (both enterprise and recruiter member) 8 and External recruiter search 9, all contained within the Database Search Visibility profile 22.

If the user chooses no to the professional member only 2 prompt the user is prompted to Join enterprise 10 or Join group 11. If the user elects to Join enterprise 11, the member will be routed to either the Professional Member Database (private) 12 or the Enterprise member database (private) 13, which then routes the user to the Enterprise member search 7 or Internal recruiter search (both enterprise and recruiter member) 8. If the user elects to Join group 10, the user will be routed to the Group Member Database (private) 14 and next to the Group member search 6.

Further illustrated is an Enterprise generated profile 15, wherein the member will be routed to either the Professional Member Database (private) 12 or the Enterprise member database (private) 13, which then routes the user to the Enterprise member search 7 or Internal recruiter search (both enterprise and recruiter member) 8. Further illustrated is a Recruiter generated profile 16, wherein the member will be routed to either the Recruiter Candidate Database (private) 17 from which the user is routed to the External recruiter search 9.

If the user elects to Join enterprise 11, the member will be routed to either the Professional Member Database (private) 12 or the Enterprise member database (private) 13, which then routes the user to the Enterprise member search 7 or Internal recruiter search (both enterprise and recruiter member) 8. If the user elects to Join group 10, the user will be routed to the Group Member Database (private) 14 and next to the Group member search 6.

Figure 2:
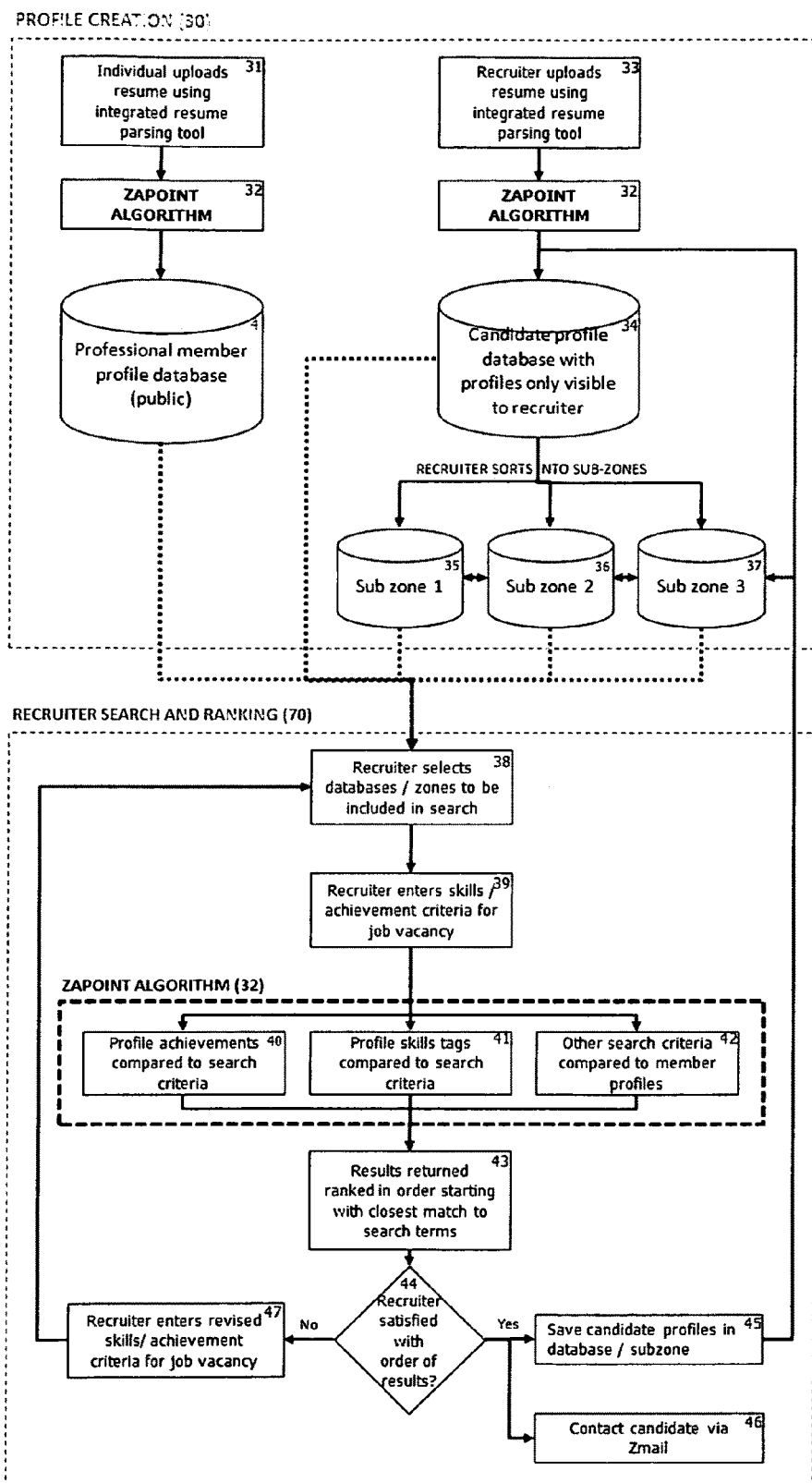
FIG. 2 illustrates the Recruiter Workflow system and menus.
Figure 3A:
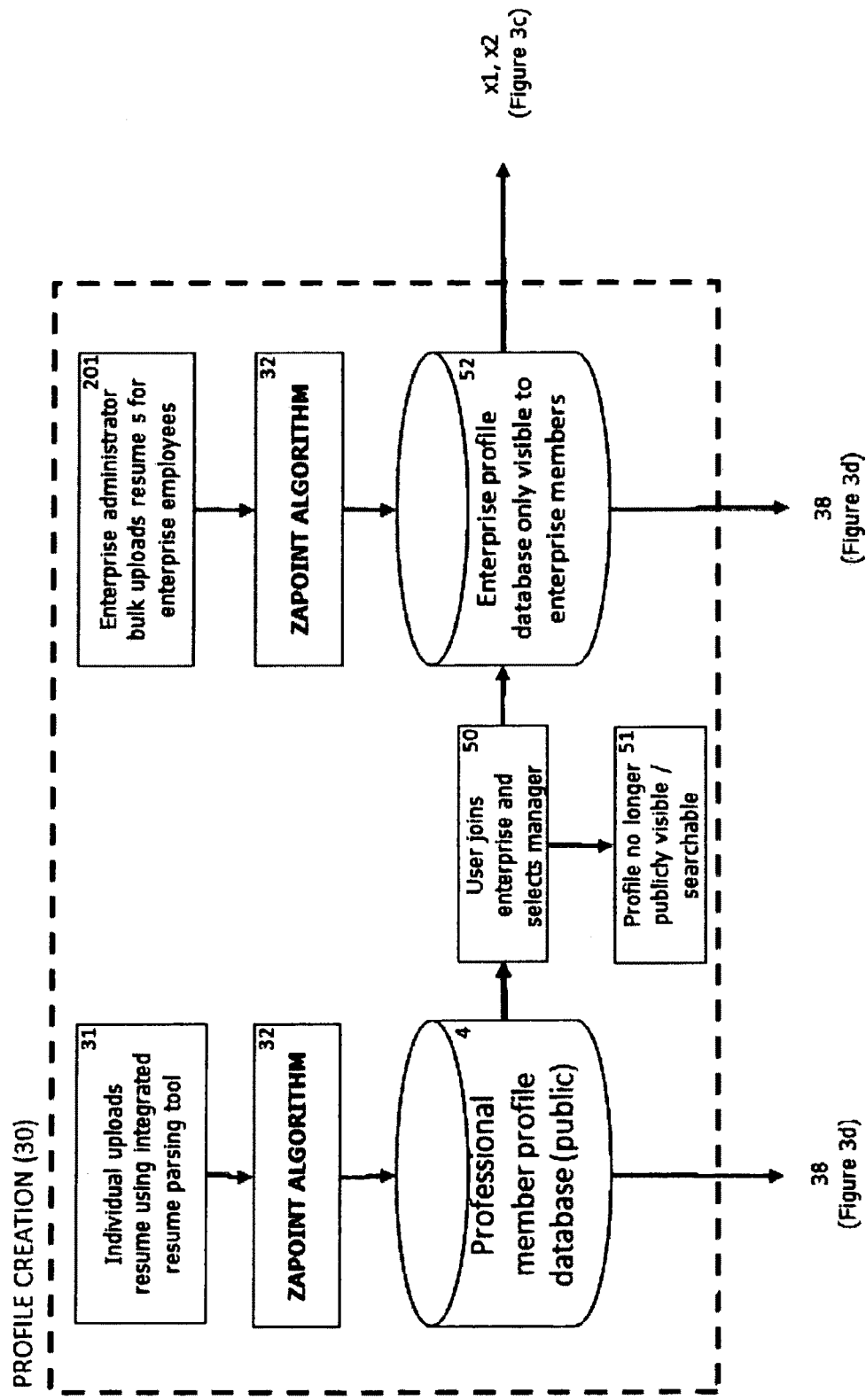
FIG. 3 illustrates the Enterprise Workflow system and menus.
Figure 3B:
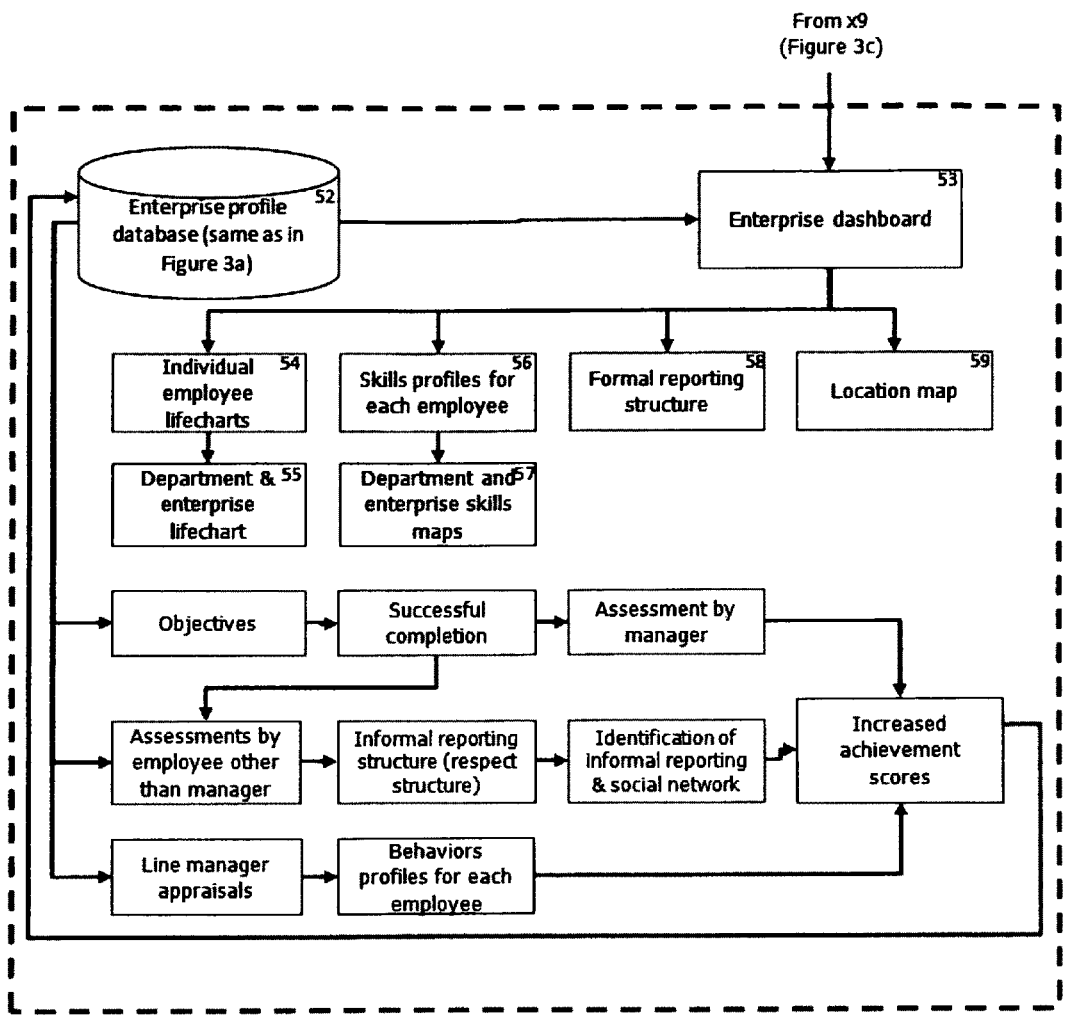
Figure 3C:
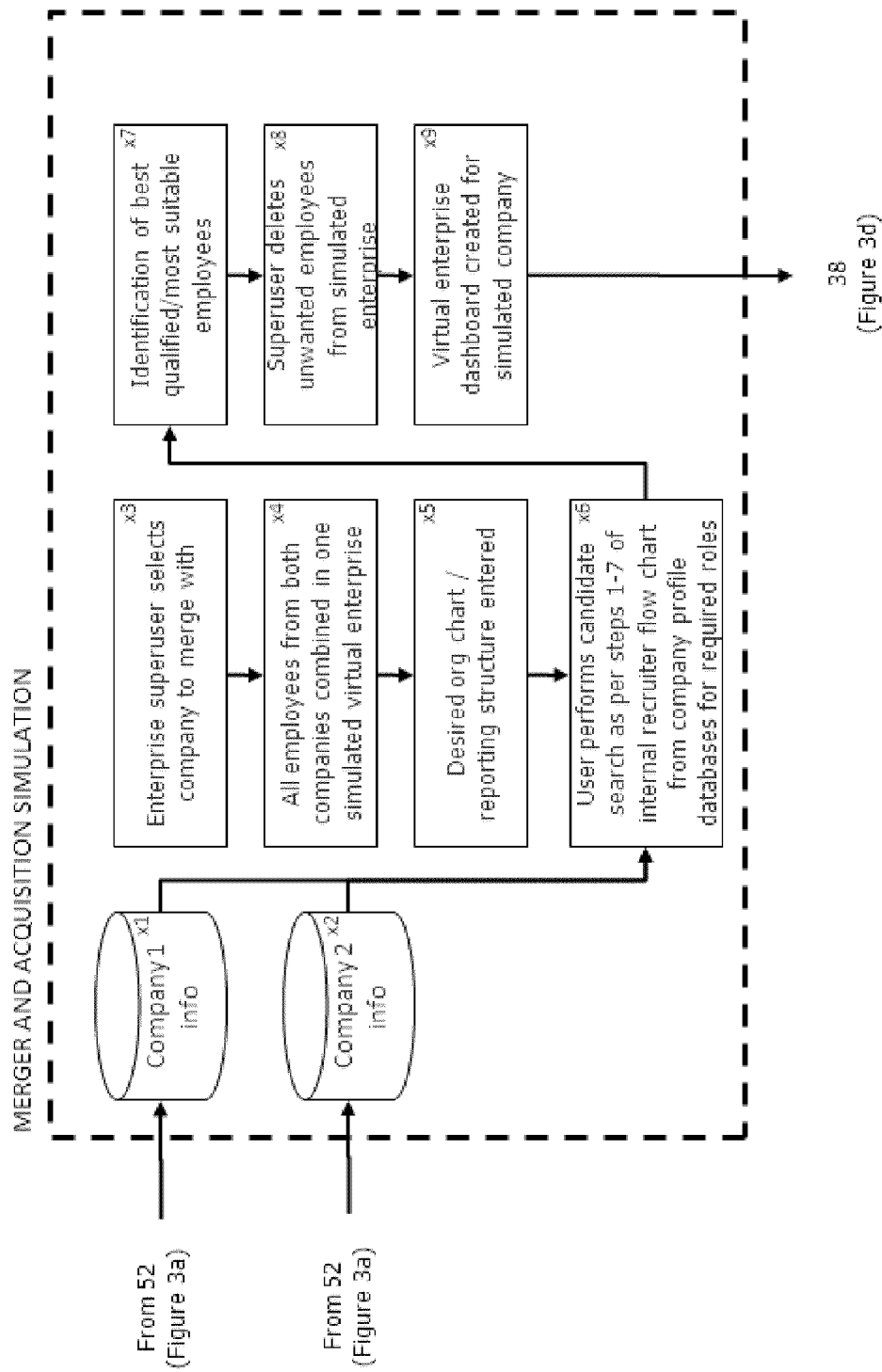
Figure 3D:
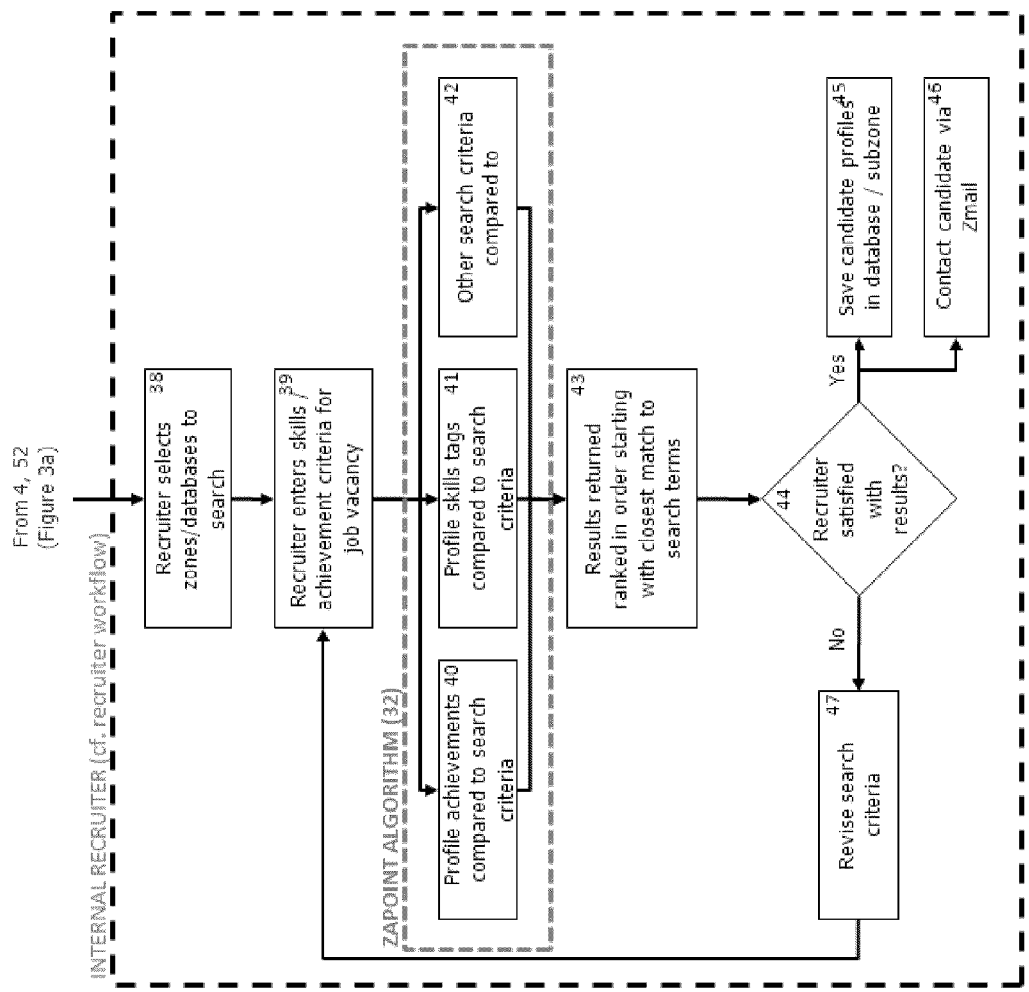

Further illustrated in FIG. 2 is the Recruiter Workflow System, where an individual first uploads a resume using the integrated resume parsing tool 31 and the information is next routed to the ZAPOINT ALGORITHM 32 for conditioning and is then routed through the Professional member profile database (public) 4. From here, the information is moved on to the Recruiter Search and Ranking mechanism wherein a recruiter is allowed to access the the individual resume and review rankings. First, the Recruiter selects databases/zones to be included in search 38 and then the Recruiter enters skills/achievement criteria for job vacancy 39. Once this is accomplished, the data is passed through the ZAPOINT ALGORITHM 32 wherein the Profile achievements are compared to search criteria 40, the profile skills tags are compared to search criteria 41 and other search criteria are compared to search criteria 42.

Next the Results returned ranked in order starting with closest match to search terms 43 and if the Recruiter is satisfied with order of results 44, the recruiter may save Save candidate profiles in database/sub zone 45 and/or Contact candidate via Zmail 46. If not, the Recruiter enters revised skills/achievement criteria for job vacancy 47 and is sent back through the loop.

In an alternative means of file creation, the Recruiter uploads a resume using an integrated resume parsing tool 33 and the resume is routed for processing through the ZAPOINT ALGORITHM 32. Next, after processing and formatting, the individual's information is forwarded to the Candidate profile database with profiles only visible to recruiter 34. Further, the candidate information may be further divided in to sub zones for particular kinds of candidates, including Sub zone 1 35, Sub zone 2 36 or Sub zone 3 37.

From here, the information is moved on to the Recruiter Search and Ranking mechanism wherein a recruiter is allowed to access the individual resume and review rankings. First, the Recruiter selects databases/zones to be included in search 38 and then the Recruiter enters skills/achievement criteria for job vacancy 39. Once this is accomplished, the data is passed through the ZAPOINT ALGORITHM 32 wherein the Profile achievements are compared to search criteria 40, the profile skills tags are compared to search criteria 41 and other search criteria are compared to search criteria 42.

Next the Results returned ranked in order starting with closest match to search terms 43 and if the Recruiter is satisfied with order of results 44, the recruiter may Save candidate profiles in database/sub zone 45 and/or Contact candidate via Zmail 46. If not, the Recruiter enters revised skills/achievement criteria for job vacancy 47 and is sent back through the loop.

Further, FIG. 4 illustrates the Search Workflow system, wherein initially, the User enters skills/achievement criteria 80. Next, the information is routed to the Zapoint member database 81. Within the database Profile achievements compared to search criteria 82, Profile skills tags compared to search criteria 83, and other search criteria compared to member profiles 84. Results returned ranked in order according to match occurrence and duration 85. The user, upon review of the information, is routed to the User satisfied with order of results menu 86. If no, then the user will be routed to the User enters revised skills/achievement criteria 87 which routes the user back to the User enters skills/achievement criteria 80. If yes, the user is routed to the End search indictor 88.

Figure 5A:
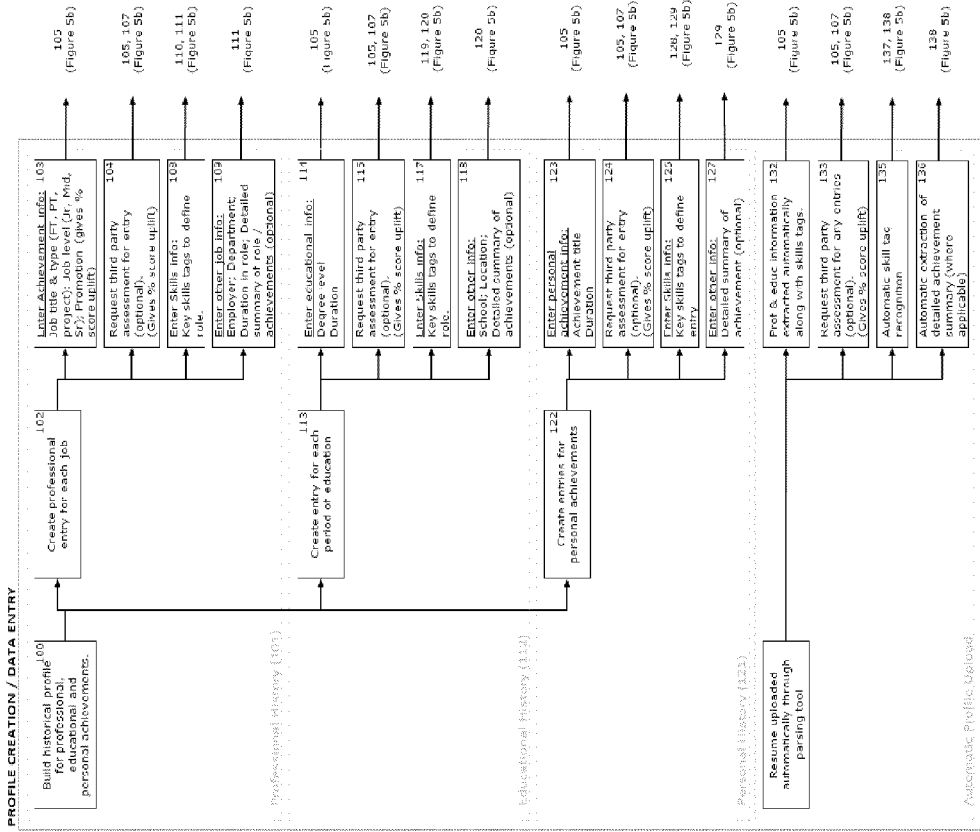
FIG. 5 illustrates the Scoring Algorithm Workflow system and menus.
Figure 5B:
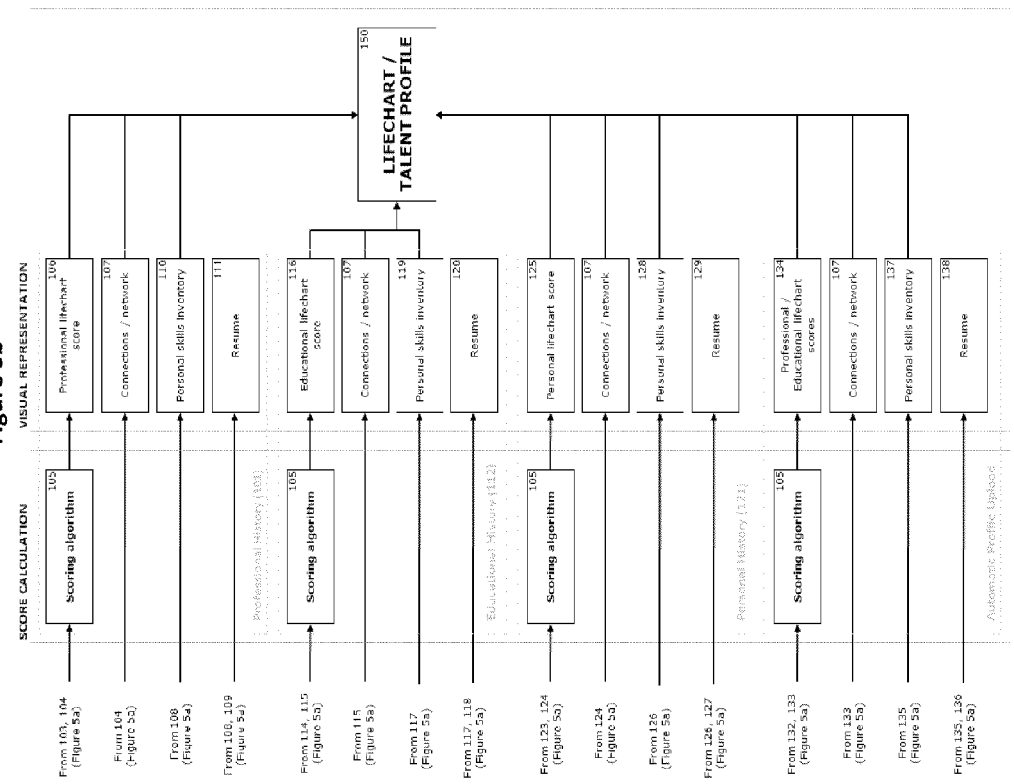
Figure 6A:
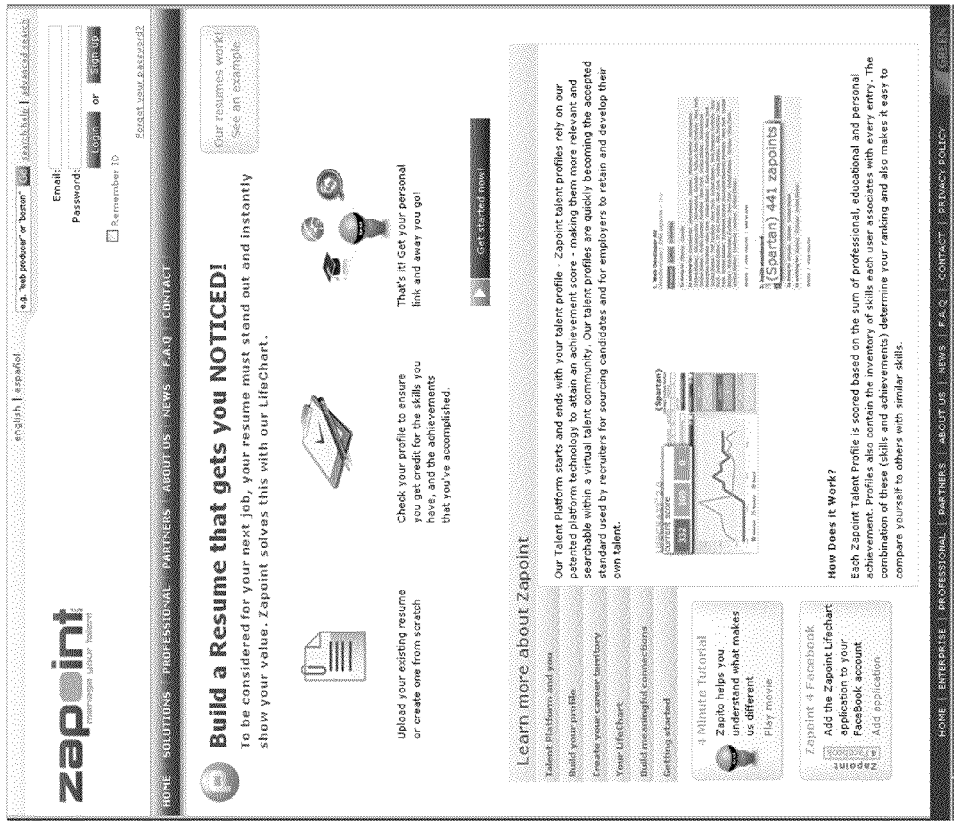
FIG. 6 illustrates an overview of the system.
Figure 6D:

Further investigating the Scoring Algorithm Workflow, as illustrated in FIG. 5 first, through the Profile Creation/Data Entry phase. Expanding on the Profile Creation/Data Entry phase, the user may first enter the Build historical profile for professional, educational and personal achievements 100. Within the Professional History menu 101, the user may first Create professional entry for each job of his career 102. In doing so, the user first accesses the Enter Achievement information 103 menu which entails entering a Job title, Job type (Full Time, Part Time or project), Job level (Junior, Mid, Senior) and Promotion (gives % score uplift). The user may also utilize the Request third party assessment for entry 104, which is optional and (Gives % score uplift). From either of these options, the user enters the Scoring Algorithm 105, receives a visual representation in the form of a Professional Lifechart Score 106, accesses the internet connection 107 and said Professional Lifechart Score 106 in order to evaluate and process the information toward creating an individual Lifechart/Lifechart 2.0 150.

Further, within the Professional History menu 101, the user may Enter Skills information and Key skills tags to define a role 108 and Enter other job information menu 109 which includes entering: an Employer, a Department, a Duration in role and a Detailed summary of role/achievements (optional). From here, the user receives visual representations in the form of a Personal skills inventory 110 and resume 111 in order to evaluate and process the information and the information is forwarded to further create an individual Lifechart/Lifechart 2.0 150.

Within the Educational History Menu 112, a user may Create an entry for each period of education 113 and first enters Enter educational information 114 including Degree level and Duration. The user may also utilize the Request third party assessment for entry 115, which is optional and (Gives % score uplift). From either of these options, the user enters the Scoring Algorithm 105, receives a visual representation in the form of a Educational Lifechart Score 116, accesses the internet connection 107 and said Educational Lifechart Score 116 in order to evaluate and process the information toward creating an individual Lifechart/Lifechart 2.0 150.

Further, within the Educational History menu 112, the user may Enter Skills information and Key skills tags to define a role 117 and Enter other information menu 118 which includes entering: a school, a location and a Detailed summary of role/achievements (optional). From here, the user receives visual representations in the form of a Personal skills inventory 119 and resume 120 in order to evaluate and process the information and the information is forwarded to further create an individual Lifechart/Lifechart 2.0 150.

Within the Personal History Menu 121, a user may Create an entry for personal achievements 122 and first enters Enter personal achievement information 123 including Achievement level and Duration. The user may again utilize the Request third party assessment for entry 124, which is optional and (Gives % score uplift). From either of these options, the user enters the Scoring Algorithm 105, receives a visual representation in the form of a Personal Lifechart Score 125, accesses the internet connection 107 and said Personal Lifechart Score 125 in order to evaluate and process the information toward creating an individual Lifechart/Lifechart 2.0 150.

Further, within the Personal History menu 121, the user may Enter Skills information and Key skills tags to define a role 126 and enter other information menu 127 which includes entering: a school, a location and a Detailed summary of role/achievements (optional). From here, the user receives visual representations in the form of a Personal skills inventory 128 and resume 129 in order to evaluate and process the information and the information is forwarded to further create an individual Lifechart/Lifechart 2.0 150.

Within the Personal History Menu 121, a user may Create an entry for personal achievements 122 and first enters Enter personal achievement information 123 including Achievement level and Duration. The user may again utilize the Request third party assessment for entry 124, which is optional and (Gives % score uplift). From either of these options, the user enters the Scoring Algorithm 105, receives a visual representation in the form of a Personal Lifechart Score 125, accesses the internet connection 107 and said Personal Lifechart Score 125 in order to evaluate and process the information toward creating an individual Lifechart/Lifechart 2.0 150.

Further, within the Personal History menu 121, the user may Enter Skills information and Key skills tags to define a role 126 and enter other information menu 127 which includes entering: a school, a location and a Detailed summary of role/achievements (optional). From here, the user receives visual representations in the form of a Personal skills inventory 128 and resume 129 in order to evaluate and process the information and the information is forwarded to further create an individual Lifechart/Lifechart 2.0 150.

Additionally, within the Automatic Profile Upload menu 130, a resume may be uploaded automatically through a parsing tool 131. Next, Professional and educational information is extracted automatically along with skills tags 132 and a user may Request third party assessment for any entries, as above (optional) 133, which again (Gives % score uplift) and then the resume is uploaded to the scoring algorithm 105. From either of these options, the user enters the Scoring Algorithm 105, receives a visual representation in the form of a combined Personal/Educational Lifechart Score 125, accesses the internet connection 107 and said Personal Lifechart Score 134 in order to evaluate and process the information toward creating an individual Lifechart/Lifechart 2.0 150.

Further, within the Automated Profile Upload menu 130, the system utilizes Automatic skill tag recognition 135 and Automatic extraction of detailed achievement summary (where applicable) 136. From here, the user receives visual representations in the form of a Personal skills inventory 137 and resume 138 in order to evaluate and process the information and the information is forwarded to further create an individual Lifechart/Lifechart 2.0 150.

Further illustrated in FIG. 3 is the ENTERPRISE WORKFLOW system wherein an individual uploads his resume using integrated resume parsing tool and the resume is evaluated through the ZAPOINT ALGORITHM 32 and on to the Professional member profile database (public) wherein the User joins enterprise and selects manager 50 and thus the Profile no longer publicly visible/searchable 51. From there, the profiles will enter the Enterprise profile database 52 which is only visible to enterprise members.

Additionally, the Enterprise administrator may bulk upload resumes for enterprise employees 201 and process these resumes through the ZAPOINT ALGORITHM 32. From there, the profiles will enter the Enterprise profile database 52 which is only visible to enterprise members. From the Enterprise profile database 52, the profiles enter the Enterprise Dashboard 53 for processing to Individual employee lifecharts 54 and Department & enterprise lifecharts 55. Further, Skills profiles for each employee 56 and Department and enterprise skills maps 57 or a formal reporting structure 58 or even a location map 59.

Within Zapoint™ Professional, a user can develop a lasting profile from and thus a user will never need to develop another resume. The Key features of Zapoint™ Professional are the Dynamic Talent Profile, the Career Management Option and the Job Seeking Option. Investigating the options, the Dynamic Talent Profile allows a user to convert a resume into a quantifiable "Talent Profile" in seconds, as illustrated below. Thus a user possesses an individual Lifechart™, which creates a visual representation of the career achievements and talent of a user and ergo, a user may compare their talent profile with others within career territories.

Next is the Career Management Option, wherein a user may leverage interactive and visual tools in order to better evaluate a career path. Additionally, a user may develop a network of mentor/mentee relationships to manage objectives and perform assessments. Further more, a user may create their own professional territory and uncover others with similar profile and thus compare profiles with others in order to determine skill gaps.

Finally, within Zapoint™ Professional, the user may access the Job Seeking Option wherein the user may identify which companies possess suitable vacancies by viewing the territories that are currently sponsored. A user can also view how actively individual recruiters are recruiting on the site, by seeing their score in Zapoint™. Further, a user may employ the Zapoint™ skill and achievement algorithm to ensure that the user is realistic regarding the approach to the job search by illustrating where a user ranks in the search results in a chosen territory.

Figure 7:
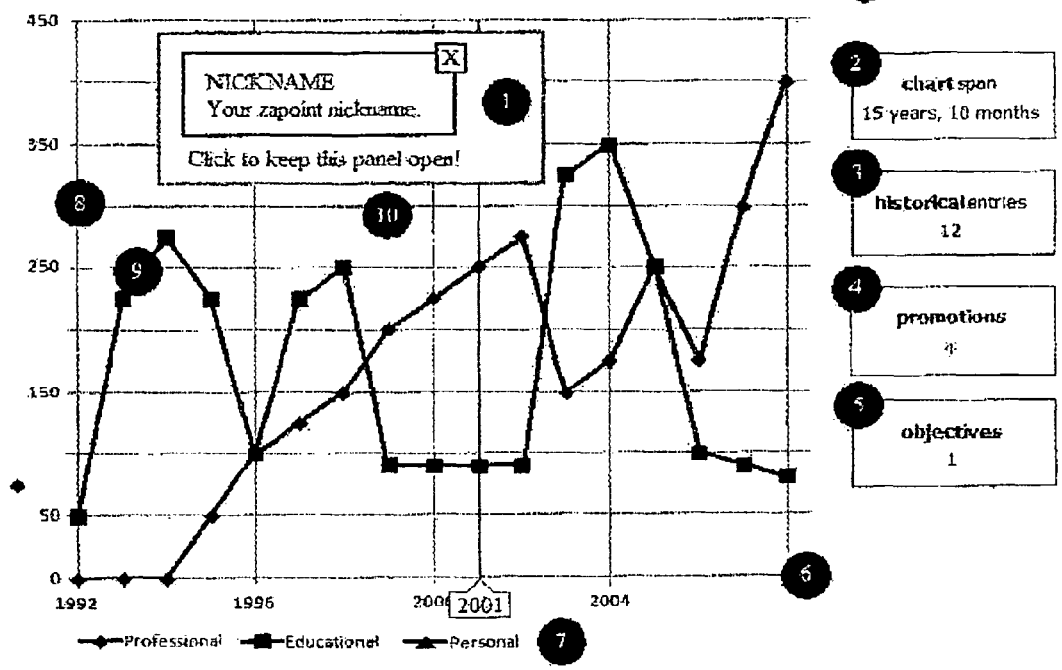
FIG. 7, illustrates a Lifechart™ with Icon 1 open, entry of the user name.
Figure 8:
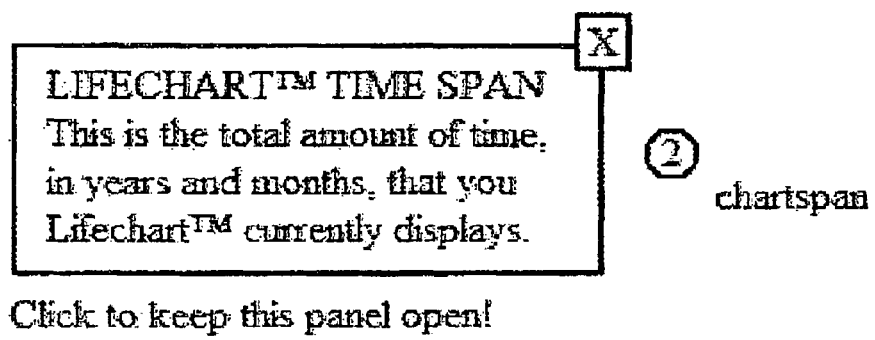
FIG. 8 illustrates a Lifechart™ with Icon 2, the chartspan menu open, wherein the total time in years is covered by the Lifechart™ span.
Figure 9:
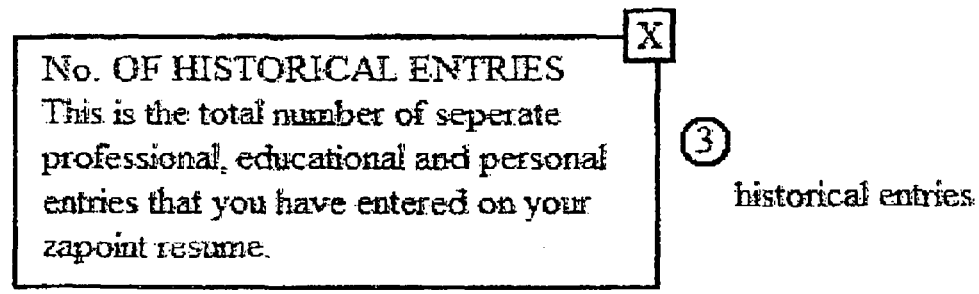
FIG. 9 illustrates a Lifechart™ with Icon 3, the historical entries menu open, and this menu comprises the total number of separate professional, personal and educational entries that a user has entered on the Zapoint™ resume.

As illustrated in FIGS. 7-16, a user can create, develop and a Zapoint™ Profile. In FIG. 7, a Lifechart™ with Indicator 1 open, entry of the user name, is illustrated. FIG. 8 a Lifechart™ with Indicator 2 the chartspan menu open, is illustrated, wherein the total time in years is covered by the Lifechart™ span. FIG. 9 a Lifechart™ with Indicator 3, the historical entries menu open is illustrated, and this menu comprises the total number of separate professional, personal and educational entries that a user has entered on the Zapoint™ resume.

Figure 10:
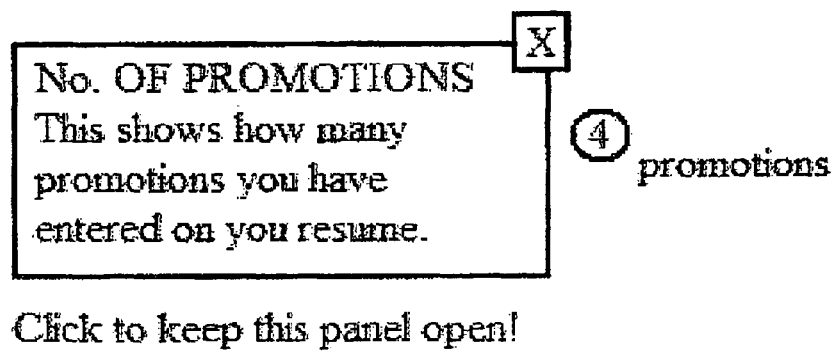
FIG. 10 illustrates a Lifechart™ with Icon 4, the Promotions menu open, wherein illustrated is the total number of promotions entered by a user.
Figure 11:
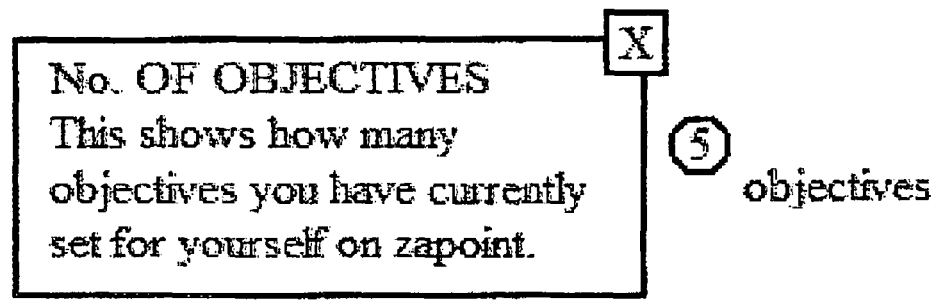
FIG. 11 a Lifechart™ with Indicator 5, the Objectives menu open, wherein this menu comprise the number of objectives a user has set for the user's purpose.
Figure 12:
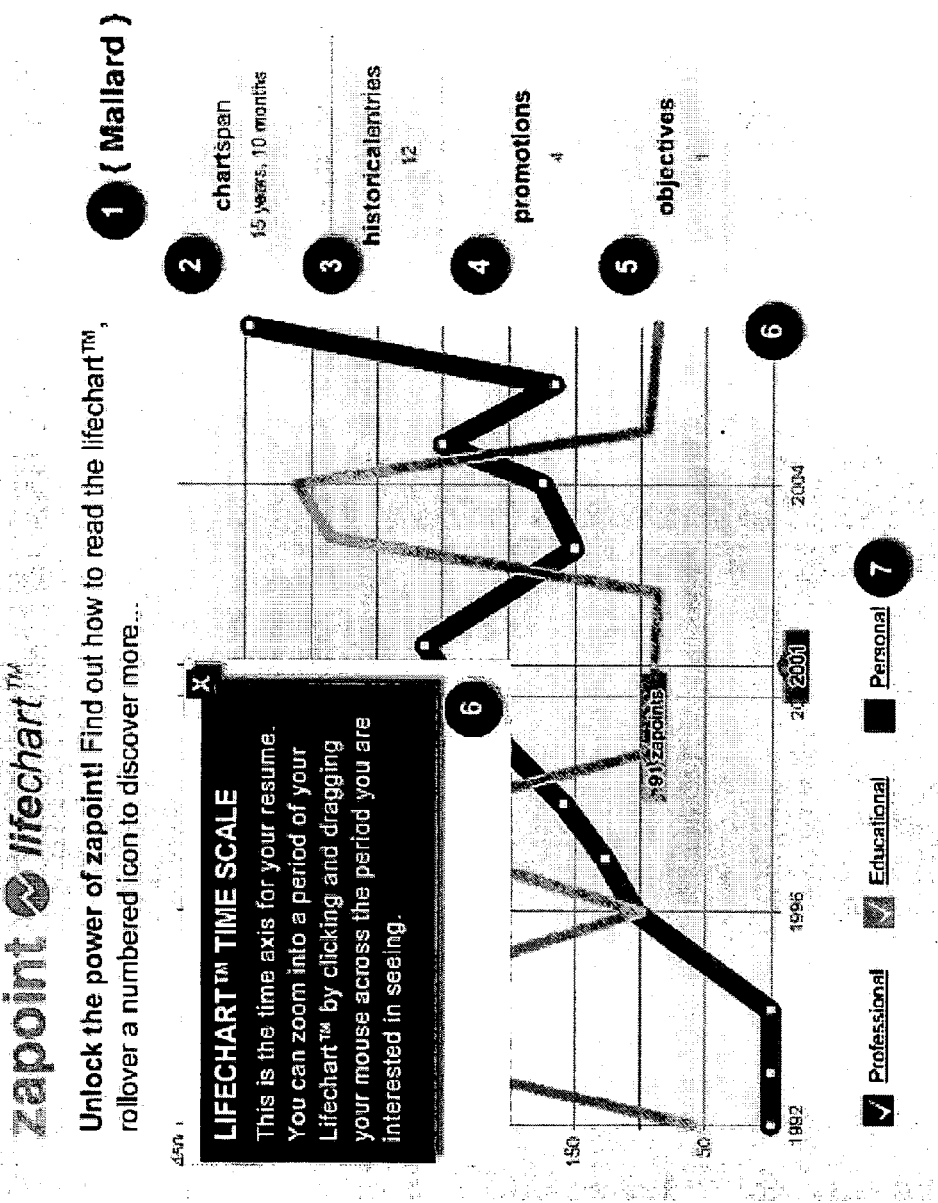
FIG. 12 illustrates a Lifechart™ with Indicator 6, the Lifechart™ time scale open, and this menu illustrates the time axis for the Lifechart™ and from here, individual time periods may be investigated by the user clicking and dragging across the desired time period.

Additionally, FIG. 10 illustrates a Lifechart™ with Indicator 4, the Promotions menu open, wherein illustrated is the total number of promotions entered by a user. FIG. 11 a Lifechart™ with Indicator 5, the Objectives menu open, wherein this menu comprise the number of objectives a user has set for the user's purpose. FIG. 12 illustrates a Lifechart™ with Indicator 6, the Lifechart™ time scale open, and this menu illustrates the time axis for the Lifechart™ and from here, individual time periods may be investigated by the user clicking and dragging across the desired time period.

Figure 13:
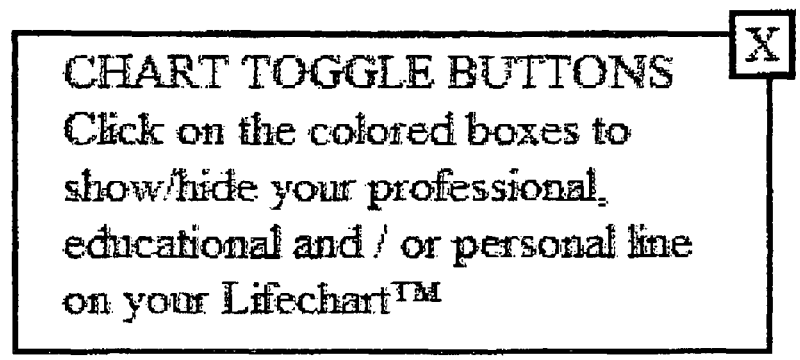
FIG. 13 a Lifechart™ with Indicator 7, illustrating the buttons for toggling between Educational, Professional and Personal lines on the individual Lifechart™.

Furthermore, FIG. 13 a Lifechart™ with Indicator 7, illustrating the buttons for toggling between Educational, Professional and Personal lines on the individual Lifechart™. FIG. 14 a Lifechart™ with Indicator 8, the Achievement scale, illustrates the number of zapoints a user is achieving based on the inputs of history, objectives and yearly assessments. FIG. 15, a Lifechart™ with Icon 9, discussing the Educational, Professional and Personal lines and how each individual line serves to illustrate the career direction of the user. Finally, FIG. 16 Lifechart™ with Icon 10, Number of zapoints, illustrates to the user how to utilize the pointer within the Lifechart™ to find out how many zapoints have been accumulated on each of Educational, Professional and Personal lines to observe the actual number of zapoints accumulated. Thus, in all, Zapoint™ Professional is a career management tool helping ambitious professionals to build a graphical resume.

In further embodiments, the invention described herein may exist as a series of differing departments to define an overall talent platform. Zapoint™ Groups is a talent-based social network for enterprises, alumni organizations and professional affiliations. It is designed to empower communities to share knowledge and ideas that foster innovation and opportunity.

Zapoint™ Groups offers its communities an innovative networking and communication tool which allows users access to detailed and up to date information on other members of the group including skills, current position, global mapping and talent profiles. With Zapoint™ Groups, you can build relationships and stay connected with those people that matter in your career.

Key Features of the Zapoint™ Groups Alumni Networking, Enterprise Social Networking, Communication, Mapping.

Regarding Alumni Networking, users may join or create your own secured talent-based social network to strengthen alumni relations and build connections and opportunities for alumni. Zapoint™ Groups provides university organizations the ability to communicate with their alumni more effectively and view their ongoing skills and achievements.

Regarding Enterprise Social Networking, this system empowers employees to share knowledge and information throughout your enterprise. Also, a user may develop a living knowledge map across your enterprise and watch your employees drive innovation and the next "big idea."

Regarding Communication, from here, users may communicate directly with a single Group member or the entire community using our secure messaging service. Users can also post messages to "message walls" to reach the widest of audience or post and share pictures and files that you wish to share with the Group.

Regarding Mapping, a user may see where in the world group members are located, using Google mapping technology. The interactive map gives members instant visualization of the diversity and location of group members, and enables them to access members' profiles directly from the map.

In addition, extended from Zapoint™'s Talent Platform, Zapoint™ Enterprise is an easy-to-use talent management application designed for HR practitioners and line of business (LOB) managers to identify high potential employees and to better understand the relationships between organizational talent and business performance.

Powered by the Zapoint™ algorithm, the Zapoint™ Enterprise helps organizations identify the skills necessary to carry out company objectives, while also identifying high potential employees critical to an organization's success. Zapoint™ Enterprise combines features for skills benchmarking, enterprise social networking, performance management, succession planning, recruiting and various workforce related analytics and reporting.

Key Features of the Zapoint™ Enterprise system are Dynamic Talent Profiles and Org Charts, Skills Benchmarking, Succession Planning and Analytics, Performance Management, Enterprise Social Networking & Analytics, Recruiting.

Addressing Dynamic Talent Profiles and Org Charts, a user may create dynamic, visual and highly interactive organizational charts and talent profiles across your organization. Revealed are both formal and informal organizational structures, with the former representing the formal reporting structure and the latter creating the "Respect Structure." Thus, an entity can discern where the most critical skills lie inside an organization and who the thought leaders are inside a business.

Discussing Skills Benchmarking, a user may instantly view and analyze the relationships between talent structures and business performance m order to discern what are the most critical skills required to execute your business strategy.

Discussing Succession Planning and Analytics, an entity can identify high potential employees and build a pipeline of future leaders for high impact roles. In addition, identify where the strategic and most common skills lie inside the organization. Thus, a user may discern whether the user is in the right employment place and if they are being allocated to the right assignments.

Discussing Performance Management, an entity may cascade goals and objectives throughout the entire organization and manage and assess outcomes proactively and ergo discern whether goals are aligned properly to produce optimal results.

Reviewing the Enterprise Social Networking & Analytics Empower employees to build trust and share knowledge, ideas and be drivers of innovation option, a user can also, identify the "respect structure"—the thought leaders and change agents within the company—and how do you share knowledge today. This further assists entities to research what happens when you lose knowledge.

Discussing Recruiting Automate candidate selection and bring in the talent necessary to carry out company objectives with our integrated service, Zapoint™ Recruiter.

Furthermore, Zapoint™ Recruiter—is an advanced search and hiring solution for recruiters designed to automate candidate selection. Zapoint Recruiter uses a set of integrated technologies that combine our patented talent algorithm, automatic text extraction, fuzzy search, and the ability to set talent search criteria. Zapoint™ Recruiter then normalizes the search query into a logical candidate grouping with the most relevant results at the top. Zapoint™ Recruiter automates candidate selection and helps recruiters avoid wasting hours and money parsing through online resume banks and job board services for the best candidate.

Key Features of the Zapoint™ Recruiter system are Resume Processing & Data, Extraction, Sponsor Career Territories, Candidate Ranking & Search, Career Site Management, Applicant Tracking.

Further, the Zapoint system and talent platform may be embedded within a companies your applications. Extend the power of our platform so you can capture more details about the skills and achievement in your employee or member community. Embedding Zapoint's Talent Platform into your application improves talent search; helps discover virtual pools of talent; and helps benchmark skills and much more.

Examples of some the partner applications and benefits are Social & Professional Networks, Online Job Boards & Resume Repositories, and Talent Management Applications.

In addition, extended from Zapoint™ Enterprise, Zapoint™ Diversity Dashboard enables businesses to instantly gain insights into corporate culture and employee diversity. The dashboard enables HR executives to examine both demographics, and performance against diversity targets for individuals, departments and the enterprise as a whole.

By using Zapoint™ Diversity Dashboard in conjunction with Zapoint™ Enterprise, businesses can tie diversity efforts to individual performance objectives, thus making them central to the performance management and assessment process. This helps to both instill a culture of inclusivity and monitor progress against corporate diversity targets. Key Features of the Diversity Dashboard are Demographic Tracking, Diversity Targets and Analysis.

Regarding Demographic Tracking, simply by using information gathered to complete employee profiles on Zapoint™ Enterprise, the dashboard enables HR executives to monitor and assess demographic diversity both in individual departments and across the enterprise as a whole. This enables them to more easily reach corporate diversity targets as well as identifying centers of excellence and opportunities for further diversification.

Regarding Diversity Targets, by connecting corporate Diversity targets to Zapoint™ Enterprise's performance management and career development capabilities, the Diversity Dashboard facilitates the creation and maintenance of an inclusive culture across the organization.

Regarding Analysis, as well as collecting and graphically displaying diversity data for the company, Zapoint™ Diversity Dashboard enables CEOs and HR Executives to compare diversity in different parts of the organization, helping them to develop strategies to address improvement areas, as well as identifying top performing departments. This can be undertaken at the individual, department, division or enterprise level.

Figure 18:
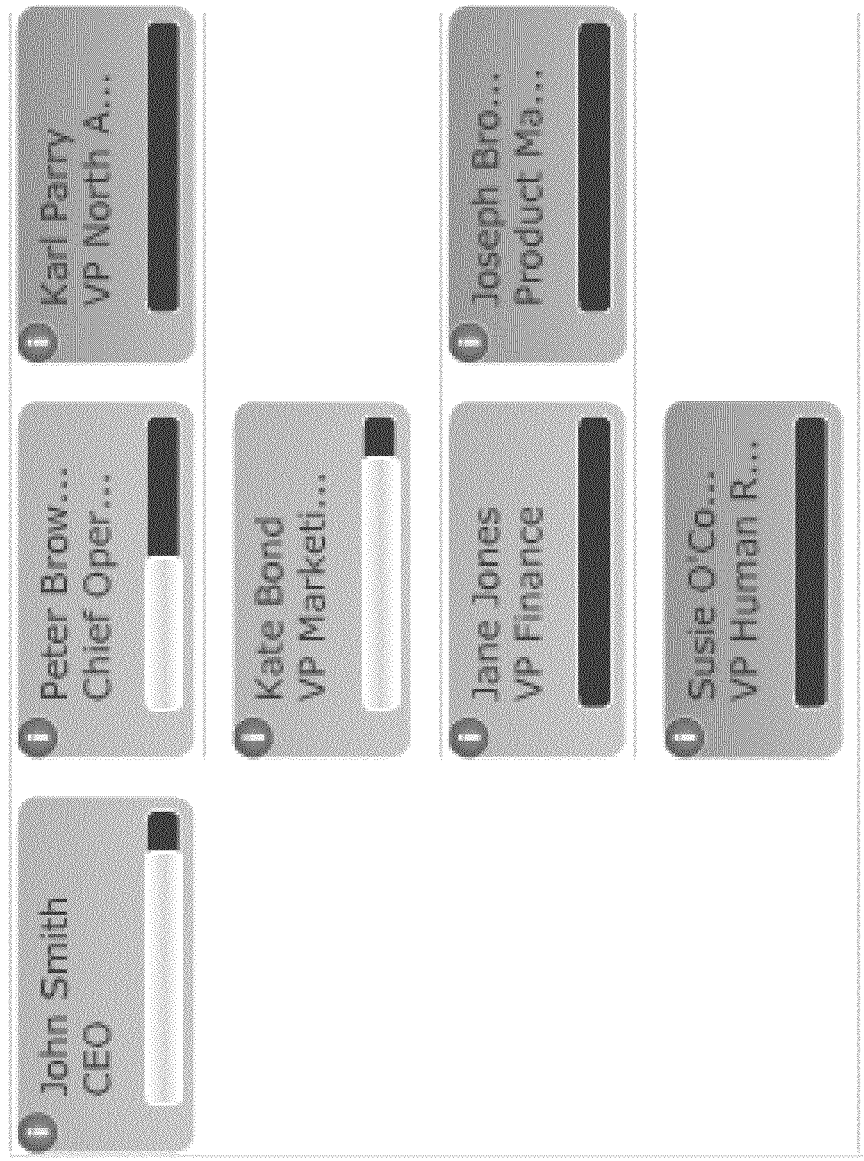
FIG. 18 illustrates an Enterprise Dynamic Organization Chart.
Figure 19:
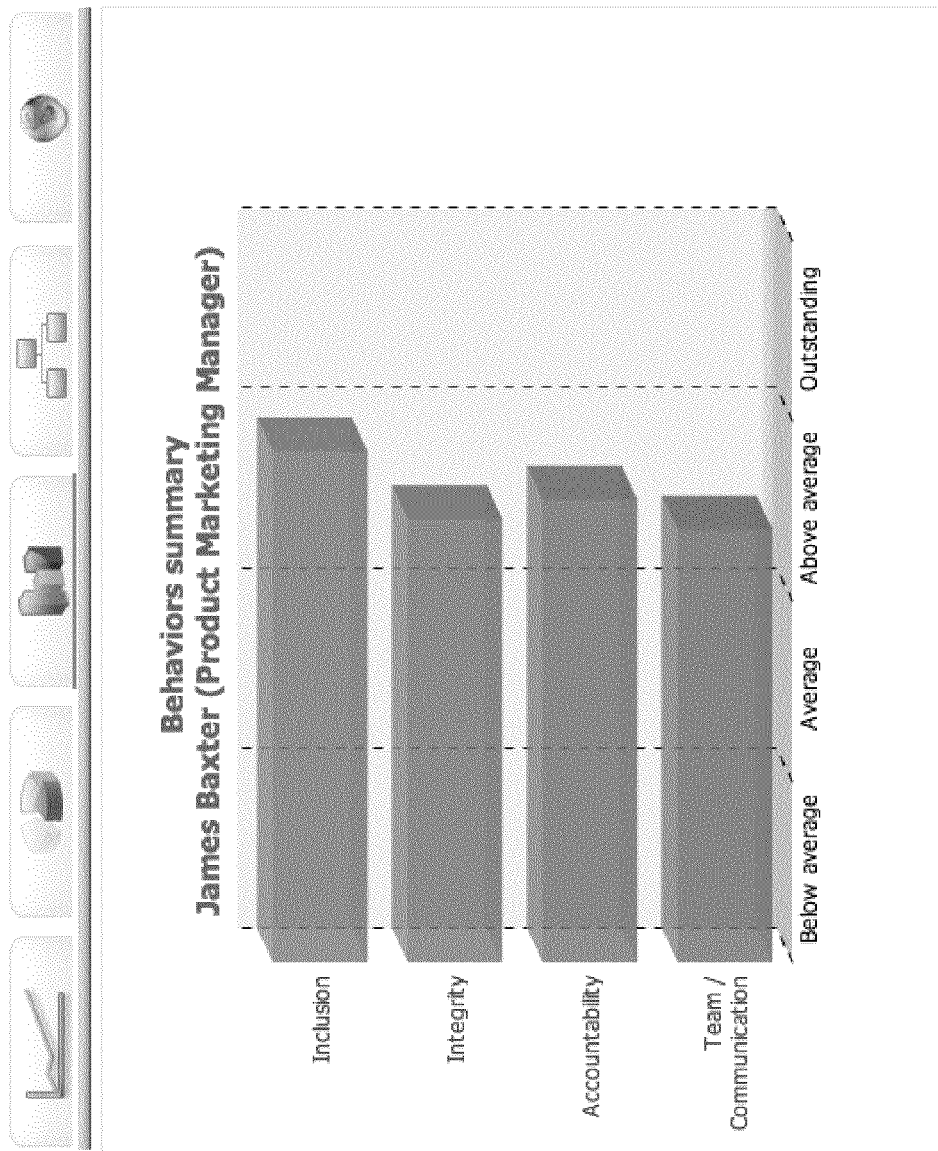
FIG. 19 illustrates an Enterprise Behavioral Skills Chart.
Figure 20:
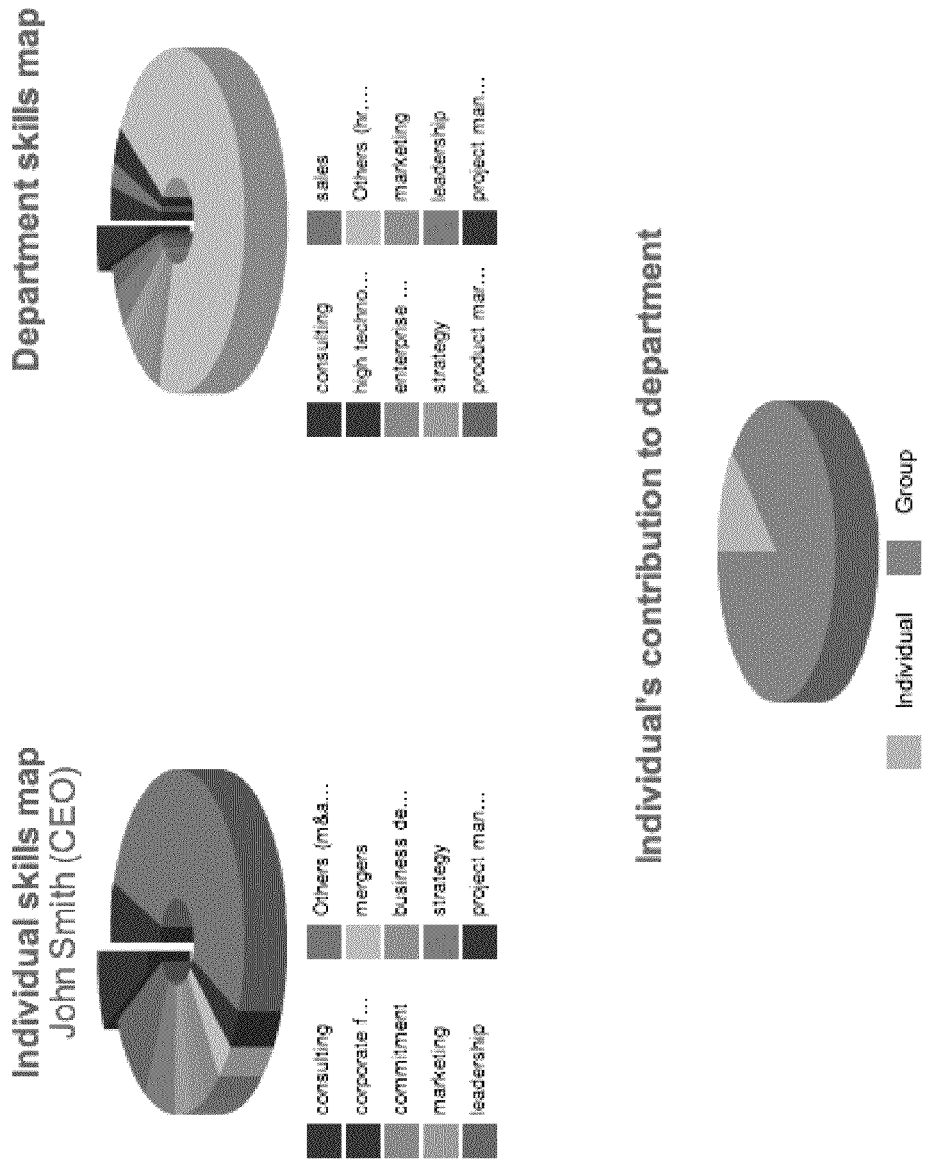
FIG. 20 illustrates an Enterprise Skills Benchmarking.
Figure 21:
FIG. 21 illustrates the launch page of the Enterprise menu.
Figure 22:
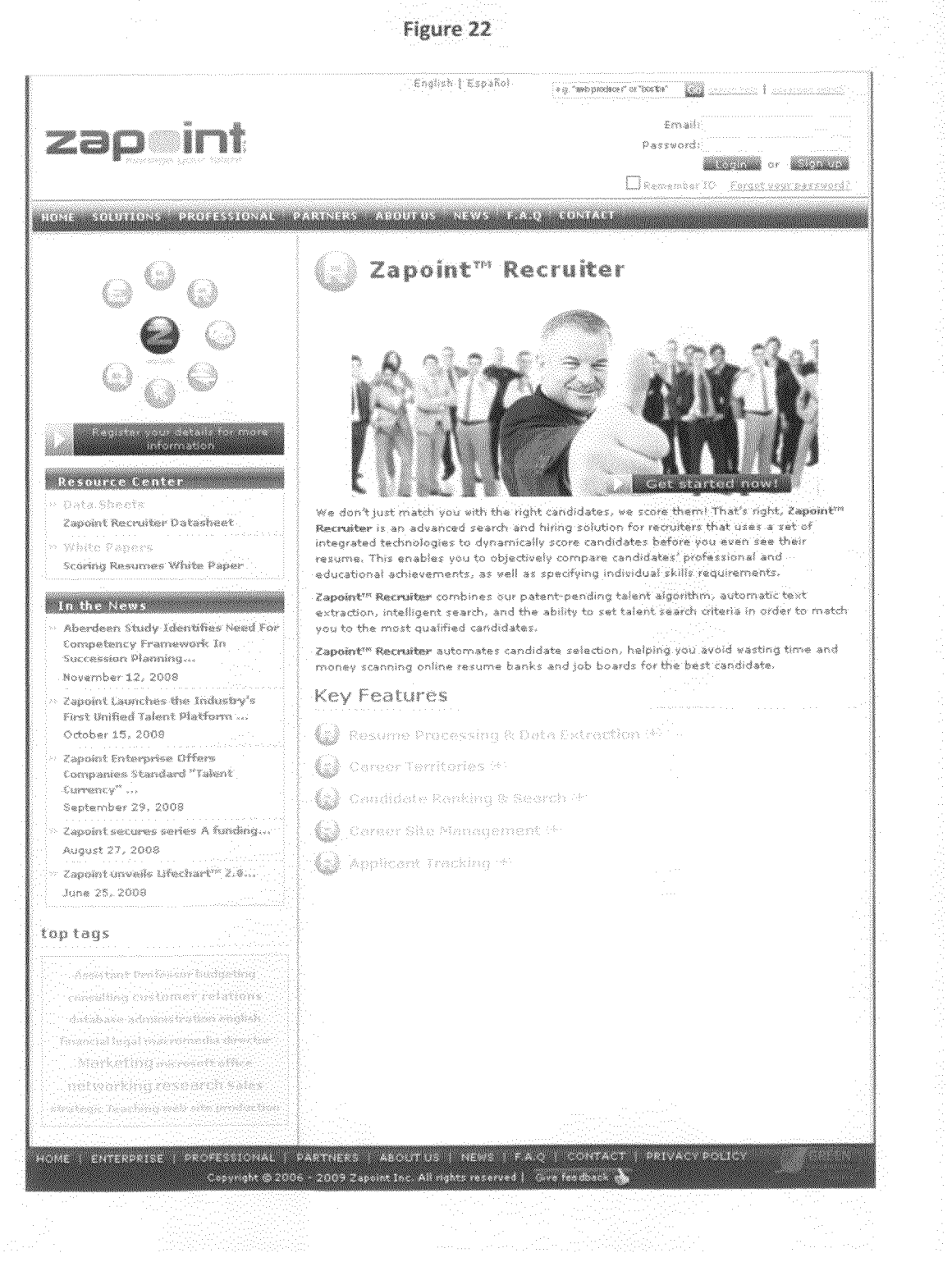
Figure 23:
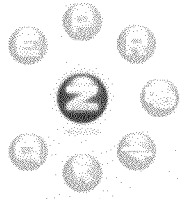
FIG. 23 illustrates the launch page of the Partner Applications menu.
Figure 24:
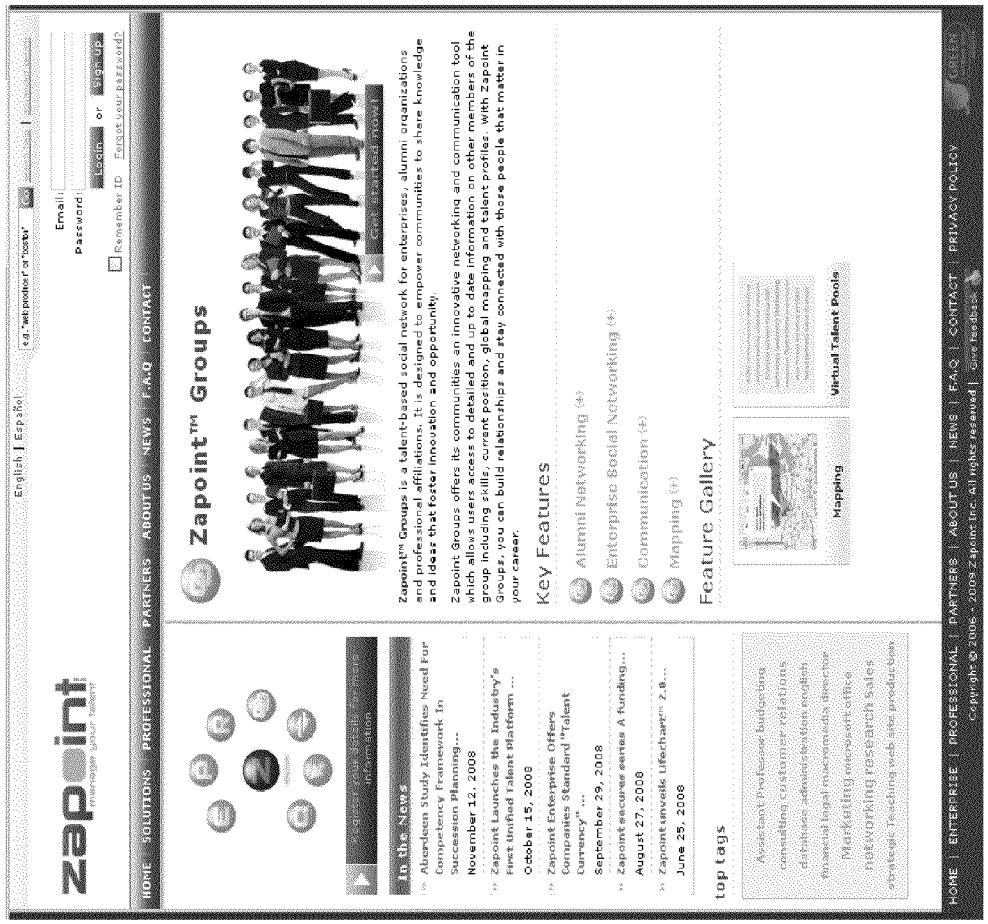
FIG. 24 illustrates the launch page of the Group menu.
Figure 25:
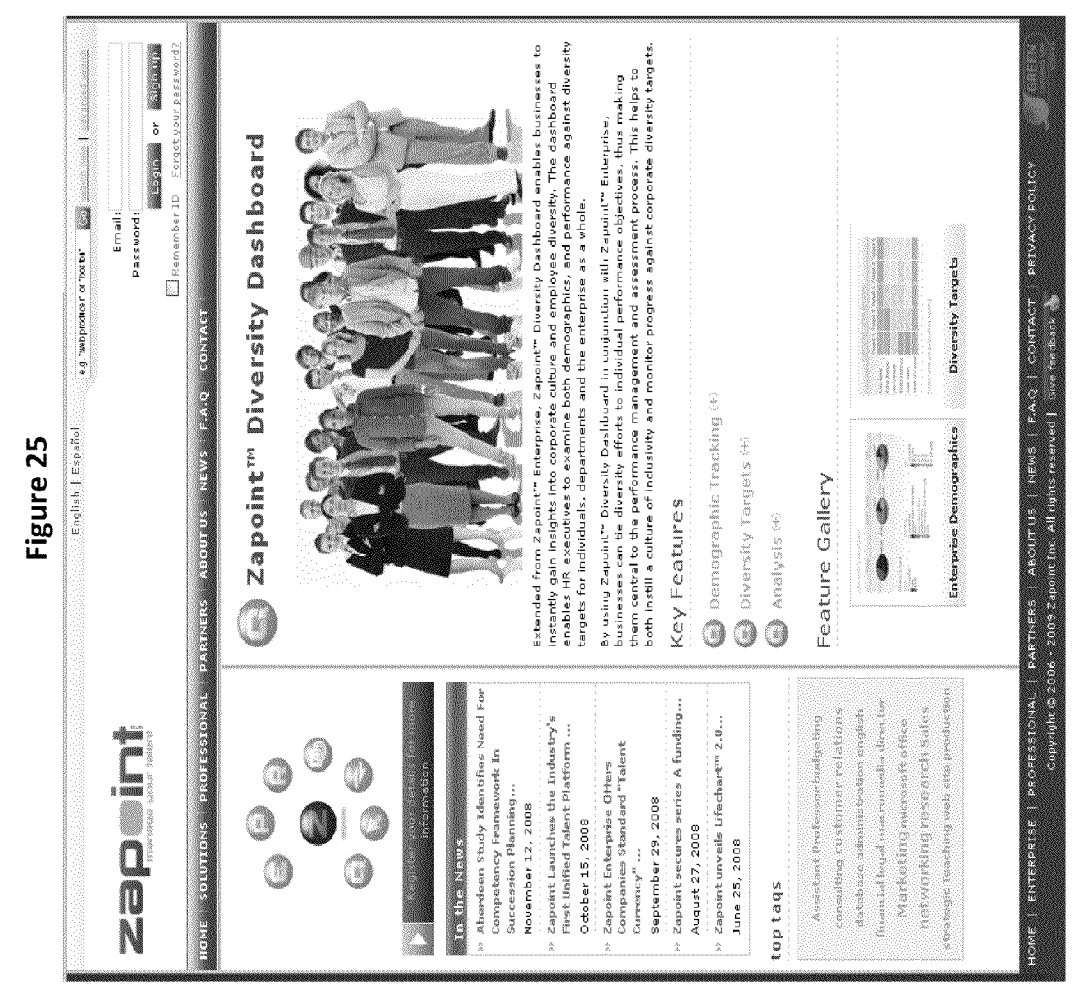

FIG. 17 illustrates an Enterprise Lifechart™ and FIG. 18 illustrates an Enterprise Dynamic Organization Chart, as seen by a user on the web site zapoint.com. Further, FIG. 19 illustrates an Enterprise Behavioral Skills Chart and FIG. 20 illustrates an Enterprise Skills Benchmarking, again as seen by a user on the website zapoint.com. FIG. 21 illustrates the launch page of the Enterprise menu. FIG. 22 illustrates the launch page of the Recruiter menu. FIG. 23 illustrates the launch page of the Partner Applications menu. FIG. 24 illustrates the launch page of the Group menu. FIG. 25 illustrates the launch page of the Diversity Dashboard menu.

What is claimed is:

1. A method of creating a profile for assessment of growth of an individual comprising:
   establishing a user account for a user;
   receiving entry of a personal resume information comprising achievement entries and skills entries, the personal resume information being stored in the user account;
   forwarding said information stored in the user account to one or more computers;
   attributing a numerical value to each of the achievement entries and skills entries within the user account by the one or more of the computers comprising the steps of
   attributing a first numerical value to a professional achievement entry by a first calculation by the one or more of the computers using a first algorithm disposed to utilize a set of weighted scores, the weighted scores being determined based on a job type, a job level, and a duration of professional achievement;
   attributing a second numerical value to an educational achievement entry by a second calculation by the one or more of the computers using a second algorithm disposed to utilize a set of weighted scores, the weighted scores being determined based on an education level and a duration of educational achievement;
   attributing a third numerical value to a personal achievement entry by a third calculation by the one or more of the computers using a third algorithm disposed to utilize a set of weighted scores, the weighted scores being determined based on a duration of personal achievement;
   attributing a fourth numerical value to an employment objective achievement entry by a fourth calculation by the one or more of the computers using a fourth algorithm disposed to utilize a set of weighted scores, the weighted scores being determined based on an objective, a complexity, a duration of employment, and a level; and
   attributing a fifth numerical value to each of the skills entries by a fifth calculation by the one or more of the computers using a fifth algorithm disposed to utilize a set of weighted scores, the weighted scores being determined based on a duration of the development of the skill;
   providing an achievement score by the one or more of the computers based on a sum of the first, second, third, fourth and fifth numerical values attributed to each of the achievement entries and the skills entries; and
   developing and displaying a chart output showing the achievement score at a given time using the one or more of the computers.

2. The method of creating a profile for assessment of growth of an individual of claim 1 wherein said set of achievement entries is selected from the group consisting of a user's professional achievements, educational achievements, and personal achievements.

3. The method of creating a profile for assessment of growth of an individual of claim 1 further comprising the step of creating a resume based on the achievement entries and skills entries.

4. The method of creating a profile for assessment of growth of an individual of claim 3 wherein the resume comprises text versions of the achievement entries and skills entries comprising skills tags that are automatically extracted from said resume an electronic upload and wherein said resume is editable by the user.

5. The method of creating a profile for assessment of growth of an individual of claim 1 wherein said method is presented as an online interface, and a step of receiving a revenue is selected from the group consisting of free service supported by advert clicks and a premium paid service.

6. The method of creating a profile for assessment of growth of an individual of claim 1 wherein said step of receiving entry of a personal resume information comprises receiving entry by a user.

7. The method of creating a profile for assessment of growth of an individual of claim 1 wherein said step of receiving entry of a personal resume information comprises receiving entry by an administrator.

8. The method of creating a profile for assessment of growth of an individual of claim 1 further comprising the step of receiving a revenue using a revenue earning model wherein a revenue earning model comprises:
   using an alumni association networking and communication tool with database capabilities for storing and displaying member information to other members of the alumni association;
   using an enterprise talent management tool which creates an individual user profile for each of the participating employees and allows the enterprise to map skills and achievements, displaying this information in a variety of formats;
   using a recruitment tool for use by both internal enterprise recruiters and recruitment companies to search the user profiles in the database to identify potential candidates for job vacancies; and,
   using a resume processing tool which enables recruiters to automatically upload candidate resumes, to create a profile for each candidate, which are then stored in a closed environment which the recruiter can search in order to list candidates in order, according to how they match the search criteria.

* * * * *